(12) United States Patent
Van Luchene

(10) Patent No.: US 8,751,343 B2
(45) Date of Patent: *Jun. 10, 2014

(54) PROCESS AND APPARATUS FOR VIDEO GAME DEVELOPMENT

(75) Inventor: Andrew Van Luchene, Santa Fe, NM (US)

(73) Assignee: Leviathan Entertainment, LLC, Santa Fe, NM (US)

( * ) Notice: Subject to any disclaimer, the term of this patent is extended or adjusted under 35 U.S.C. 154(b) by 636 days.

This patent is subject to a terminal disclaimer.

(21) Appl. No.: 12/725,095

(22) Filed: Mar. 16, 2010

(65) Prior Publication Data

US 2010/0173696 A1    Jul. 8, 2010

Related U.S. Application Data

(63) Continuation-in-part of application No. 11/560,456, filed on Nov. 16, 2006, now abandoned, and a continuation-in-part of application No. 11/368,143, filed on Mar. 3, 2006, now Pat. No. 7,677,974, and a continuation-in-part of application No. 11/355,232, filed on Feb. 14, 2006, now abandoned, and a continuation-in-part of application No. 11/380,489, filed on Apr. 27, 2006, now abandoned, and a continuation-in-part of application No. 11/279,991, filed on Apr. 17, 2006, now Pat. No. 7,677,973, and a continuation-in-part of application No. 11/428,263, filed on Jun. 30, 2006, now abandoned, and a continuation-in-part of application No. 11/624,659, filed on Jan. 18, 2007, now Pat. No. 7,677,975, and a continuation-in-part of application No. 11/671,373, filed on Feb. 5, 2007, now Pat. No. 7,677,979, and a continuation-in-part of application No. 11/670,304, filed on Feb. 1, 2007, now abandoned.

(51) Int. Cl.
*G06Q 40/00* (2012.01)

(52) U.S. Cl.
USPC .......................................................... 705/35

(58) Field of Classification Search
USPC ............................................... 705/26, 35–45
See application file for complete search history.

(56) References Cited

U.S. PATENT DOCUMENTS

| | | | |
|---|---|---|---|
| 2002/0087450 A1* | 7/2002 | Reddy ............................. | 705/37 |
| 2002/0087506 A1* | 7/2002 | Reddy ............................. | 707/1 |
| 2006/0178968 A1* | 8/2006 | Jung et al. ...................... | 705/35 |
| 2008/0140557 A1* | 6/2008 | Bowlby et al. ................. | 705/37 |
| 2008/0228663 A1* | 9/2008 | Smith ........................ | 705/36 R |
| 2010/0153253 A1* | 6/2010 | Mintz ............................. | 705/37 |

OTHER PUBLICATIONS

Manju Puri, Samuel C. Wood, Kevin Sachs, Venture Capital Game: Overview, Nov. 2000, http://faculty.fuqua.duke.edu/~mpuri/overview.pdf.*

* cited by examiner

Primary Examiner — Seth Weis

(57) ABSTRACT

In an embodiment, apparatus and methods for video games permit obtaining funding for developing game environments. A variety of possible funding sources are possible, such as venture capital, the issuance of private shares, transforming the game environment into a public company through an initial public offering, or through a follow on offering such as the issuance of common stock, preferred stock, or treasury stock.

6 Claims, 6 Drawing Sheets

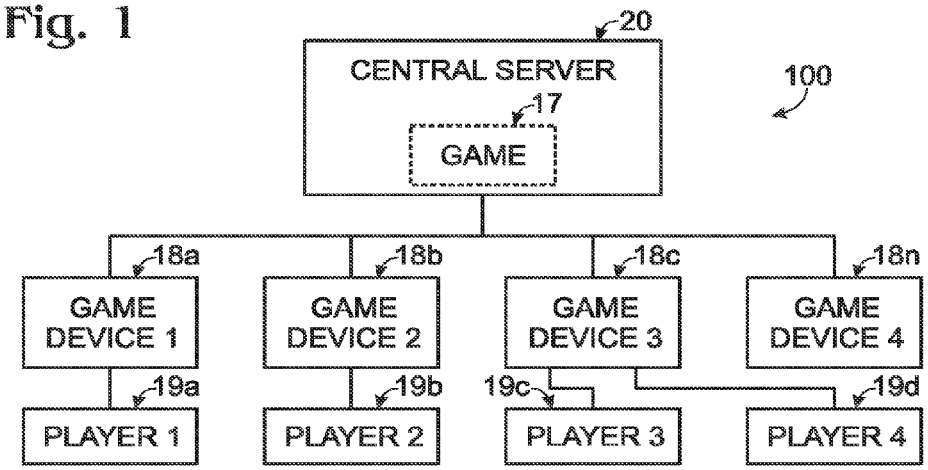
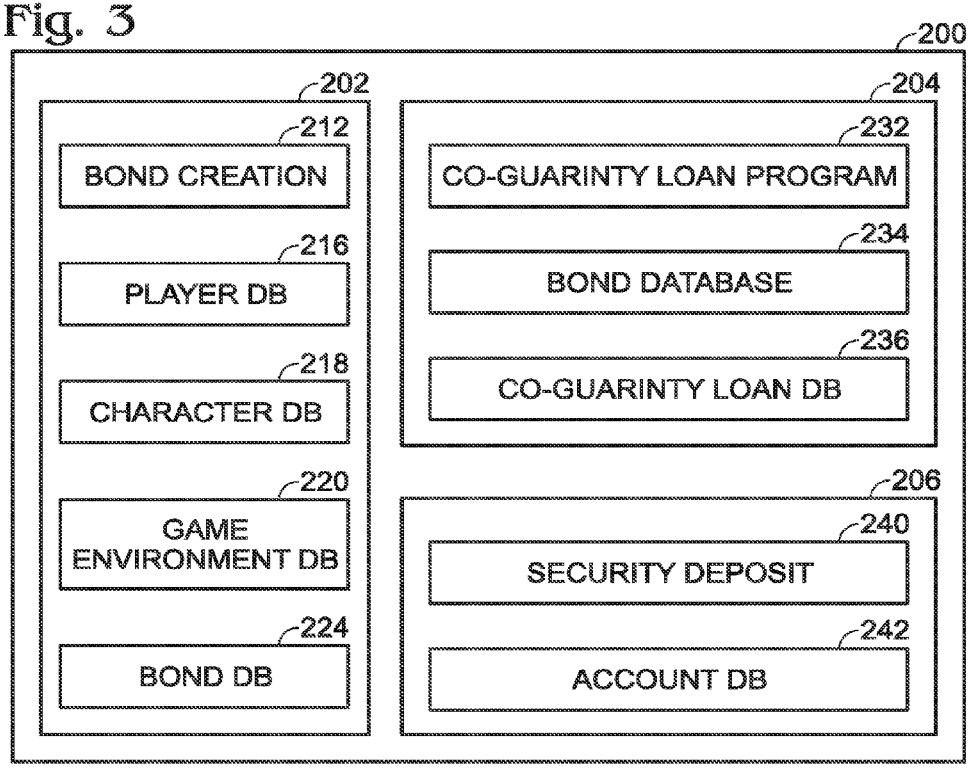

PROCESS AND APPARATUS FOR VIDEO GAME DEVELOPMENT

The present application is a continuation-in-part of each of the following U.S. patent applications, each which is incorporated herein by reference:

U.S. patent application Ser. No. 11/560,456, entitled "Exchanges in a Virtual Environment", filed Nov. 16, 2006 now abandoned;

U.S. patent application Ser. No. 11/368,143, entitled "Video Game Methods and Systems", filed Mar. 3, 2006 now U.S. Pat. No. 7,677,974;

U.S. patent application Ser. No. 11/355,232, entitled "Online Game Environment that Facilitates Binding Contracts between Players," filed Feb. 14, 2006 now abandoned;

U.S. patent application Ser. No. 11/380,489, entitled "Multiple Purchase Options for Virtual Purchases", filed Apr. 27, 2006 now abandoned;

U.S. patent application Ser. No. 11/279,991, entitled "Securing Virtual Contracts with Credit", filed Apr. 17, 2006 now U.S. Pat. No. 7,677,973;

U.S. patent application Ser. No. 11/428,263, entitled "Video Game Environment" filed Jun. 30, 2006 now abandoned;

U.S. patent application Ser. No. 11/624,659, entitled "Video Game with Registration of Funding Sources", filed Jan. 18, 2007 now U.S. Pat. No. 7,677,975;

U.S. patent application Ser. No. 11/671,373, entitled "Video Game with Control of Quantities of Raw Materials", filed Feb. 5, 2007 now U.S. Pat. No. 7,677,979; and U.S. patent application Ser. No. 11/670,304, entitled "Method and System for Allocating Resources in a Video Game", filed Feb. 1, 2007 now abandoned.

BRIEF DESCRIPTION OF THE DRAWINGS

FIG. 1 depicts a network according to an embodiment.
FIG. 3 depicts a system 200 according to an embodiment.

DETAILED DESCRIPTION

Figure 2:
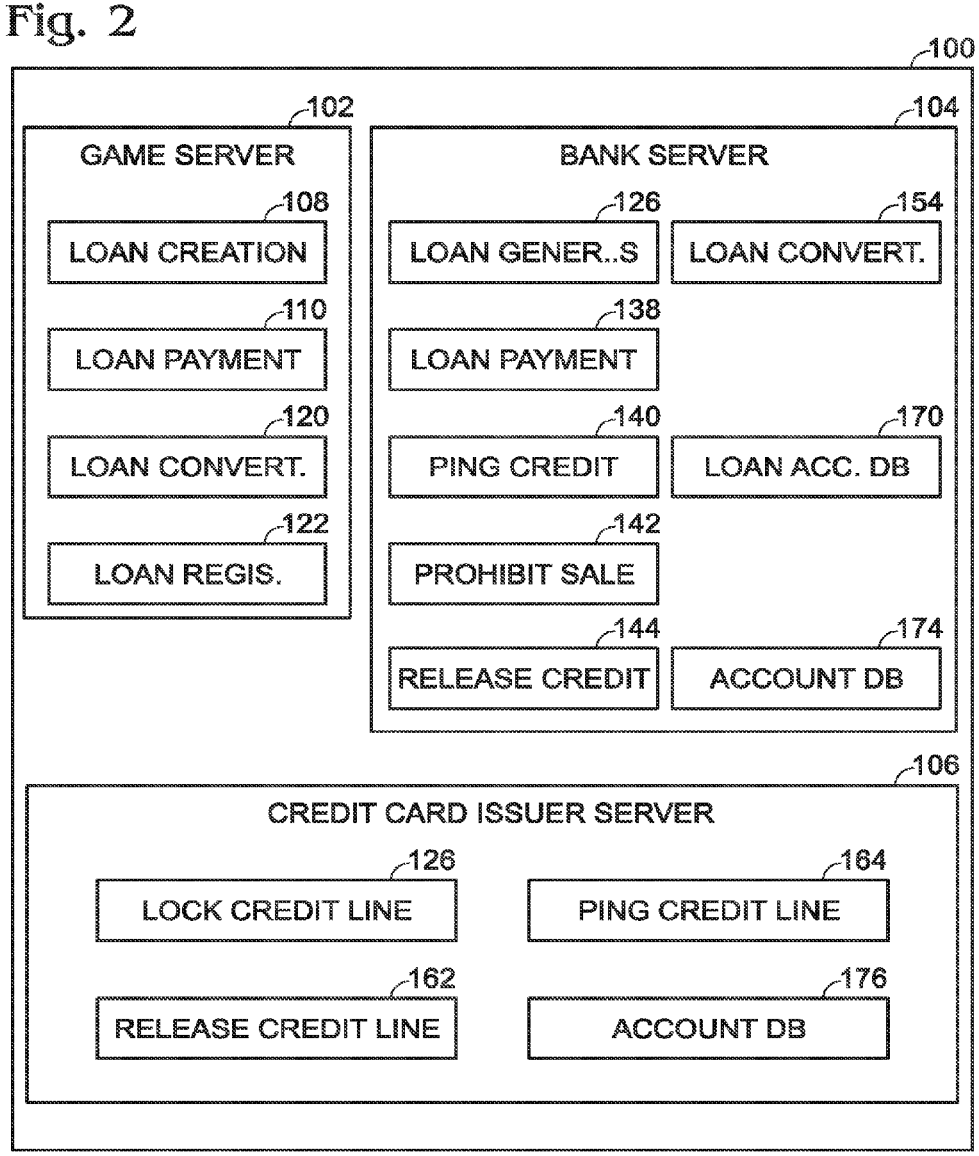
FIG. 2 depicts a system 100 according to an embodiment.

The following sections I-X provide a guide to interpreting the present application.

I. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise. Two or more described embodiments may or may not be mutually exclusive. The mere fact that two embodiments are described, or that two embodiments are described in proximity to each other or in conjunction with each other, does not imply that the two embodiments are mutually exclusive. A described embodiment may or may not be strictly narrower than and encompassed by another described embodiment. The mere fact that two embodiments are described, or that two embodiments are described in proximity to each other or in conjunction with each other, does not imply that one of the embodiments is strictly narrower than and encompassed by the other embodiment.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments would cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well as another example, the sentence "Examples of machines include a computer and a motor" means that one example of a machine is a computer, another example of a machine is a motor, and there may be other examples (e.g., things that are neither computers nor motors may nevertheless be a machine)

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The indefinite articles "a" and "an" and the definite article "the" refer to "one or more" of the noun modified by that article, unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the specific single feature," then the word "the" should be understood to refer to the previously mentioned "a specific single feature."

The term "plurality" means "two or more", unless expressly specified otherwise.

A "set" of things (e.g., a set of widgets) may include one or more of those things (e.g., one or more widgets), which are members of the set. Whether the set includes a particular item as a member is synonymous with whether a set includes the particular item.

A "subset" of things (e.g., a subset of widgets) may include one or more of those things. A subset does not imply that there must be in the subset fewer things than in some other set of things. A subset of a particular set may include some or all of the members of the set.

A reference to a "plurality" (and like terms such as "at least one", "one or more", "set" and the like) has inherent antecedent basis for the "number" of things included in the plurality (or in the set, etc.). For example, in the phrase "receiving a plurality of commands", there is inherent antecedent basis for "the number of commands". For example, in the phrase "receiving a set of commands", there is inherent antecedent basis for "the number of commands".

The term "herein" means "in the present application, including anything which may be incorporated by reference", unless expressly specified otherwise.

The phrase "at least one of" is equivalent to "one or more of", and when either such phrase modifies a plurality of things (such as an enumerated list of things), such phrase means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". Therefore, the phrase "based on" is equivalent to the phrase "based at least on" and is also equivalent to the phrase "based at least in part on". For example, the phrase "element A is based on element B and element C" covers embodiments where element A is calculated as the product of B times C (in other words, A=B×C) and where A is calculated as the sum of B plus C (in other words, A=B+C).

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" precedes do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "time", when used as a determined quantity, means any sort of time (e.g., time of day, day of week, date, year) on which one or more things are determined to occur.

The term "period of time" means any sort of duration (e.g., number of seconds, number of minutes, other durations) of one or more things.

The term "good" generally refers to anything which may be provided in exchange for money or other value, and thus "good" includes services, rights and items, whether tangible or intangible.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

Similarly, in the phrase "for each of the plurality of widgets, determining a respective price of the widget, a reference to "the widget" in that phrase means the "determining" step is applied to (performed for) each widget of the plurality of widgets. The phrase "the respective prices of the plurality of widgets" thus means the set which includes as members each respective price of the plurality of widgets.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers within the range, unless expressly specified otherwise. For example, the range "1 to 10" includes the integers from 1 to 10 (e.g., 1, 2, 3, 4, . . . 9, 10) and non-integers (e.g. 1.1, 1.2, . . . 1.9). A range may be denoted as non-inclusive explicitly, such as "the range of voltages from 2.5 volts to 10.3 volts exclusive", and such a range excludes 2.5 volts and excludes 10.3 volts.

A range can be continuous or discrete. For example, the range "from three meters to five meters" is a continuous range. The range "integer ranges from three Meters to five meters" is a discrete range.

A range includes two ends, and each such end is, where the range is inclusive, a thing that is included in the range. Thus a range inherently has antecedent basis for the term "the ends", and has antecedent basis for the term "an end" and has antecedent basis for the terms "the first end" and "the second end". Where the range is ordered or may be ordered (e.g., a range of integers that may be ordered numerically, a range of text that may be ordered alphabetically) the range includes ends that are distinguishable because of their respective ordering. Thus a range that may be ordered has antecedent basis for terms that denote the place of the end in the ordering scheme (e.g., a range that can be numerically ordered has a "low end" and a "high end").

When used to compare values (e.g., integers, fractions) which are capable of being ordered with respect to each other, the phrase "not greater than" is equivalent to "less than or equal to". Similarly, the phrase "not less than" is equivalent to "greater than or equal to".

In reference to a plurality of things (e.g., a plurality of widgets) superlatives, where a superlative may be applied to the plurality (e.g., the largest widget of the plurality of widgets, the lowest price of the set of prices) and there is inherently antecedent basis for such superlative.

For example, for a plurality of numbers, there is inherent antecedent basis for the phrase "the greatest number of the plurality of numbers", e.g., since numbers can be ordered from least to greatest and thus the greatest number is readily and unambiguously ascertainable—the greatest number is that number of the plurality of numbers which is greater than all other numbers of the plurality of numbers. Similarly, in an embodiment where there are two equal numbers, and both numbers are greater than all other numbers in the plurality, then there are two greatest numbers.

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, heuristically "best guessing", averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. Thus, the mere usage of the ordinal number "first" does not indicate that there must be a "second". For example, the use of the phrase "a first widget" does not imply that there be a second widget. Accordingly, it would not be ambiguous or indefinite to use in a claim the term "a first widget" where no "second widget" is recited in that claim (or in any other claim it depends on). The mere usage of the ordinal number "second" or greater ordinal numbers does not indicate that there must be a "first" or any lesser ordinal number. For example, the use of the phrase "a second plurality of widgets" does not imply that there be a first plurality of widgets. Accordingly, it would not be ambiguous or indefinite to use in a claim the term "a second plurality of widgets" where no "first plurality of widgets" is recited in that claim (or in any other claim it depends on). A term which is labeled by an ordinal number is different than a term that is not modified by any ordinal number. For example, in a claim a reference to "a green widget" and a reference to "a second green widget" means that there are references to different widgets and thus there is no ambiguity as to whether the second green widget is or is not a reference to the green widget. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. (Conversely, a single computer-based device may be substituted with multiple computer-based devices operating in cooperation with one another.) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology are not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. §1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed inventions are widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims recite purposes, benefits and possible uses of the claimed invention only and do not limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long periods of time (e.g. weeks at a time). In addition, devices that are in communication with each other may communicate directly or indirectly through one or more intermediaries. Devices are in communication with one another if they are capable of one-way communication with one another. For example, a first device and a second device may be in communication with one another if the first device is capable of transmitting information to the second device, and the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the process.

A computer readable medium can be in communication with a processor such that the processor can receive some or all of the instructions stored on the computer readable medium. Likewise the processor can execute some or all of the instructions stored on the computer readable medium, and can execute different instructions at different times.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks, semiconductor memory (e.g., RAM, ROM, flash drives, semiconductor hard drives). Therefore, for example, a tangible computer-readable medium is not a carrier wave or an RF transmission.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP or IP, TDMA, CDMA, and 3G; and/or (iv) encrypted to ensure privacy or prevent fraud in any of a variety of ways well known in the art.

A "user interface" is 'used by' a device, such as a computing device, to provide outputs to a user and to receive inputs from a user. For example, the user interface may direct the device to display (or otherwise provide) certain outputs (as defined by the user interface), and allow inputs to be received from the user via the device. In an embodiment, in order for the device to generate the user interface, the device executes certain instructions, e.g., instructions to output data and receive data as inputs. A user interface can include one or more output controls which output data and/or one or more input controls which allow data to be received. A type of input control allows a selection of an option from among a plurality of options, and may allow only one option to be selected, may allow one or more options to be selected, may allow that a predetermined number of options are selected, may allow that no options are selected. An input control may define the format of type of input that may be entered. A control may function as both an input control and as an output control.

A description of different capabilities of a user interface (e.g., by describing different embodiments of a user interface, by describing different things that a user interface can do) does not mean that in all embodiments the user interface must include all such described capabilities. On the contrary, such description also supports an embodiment in which, e.g., a user interface has only one of the described capabilities, and supports an embodiment in which a user interface has a particular combination of less than all of the described capabilities.

A description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as those described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal, from the scope of the invention, of additional, different embodiments, and similarly references to the description of embodiments, which all include a particular feature do not indicate a disclaimer or disavowal of embodiments which do not include that particular feature. A clear disclaimer or disavowal in the present application will explicitly refer to the scope of the invention as disclaiming or disavowing certain subject matter and will also be prefaced by a phrase such as "does not include" or "cannot perform".

IX. Incorporation By Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Conversely, the definitions and other subject matter explicitly set forth in this application should not be used to limit, define, or otherwise construe any term of any document incorporated herein by reference. Nothing explicitly set forth in this application should be interpreted as an admission or characterization of any prior art to this application.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

XI. Additional Embodiments

Unless stated to the contrary, for the purposes of the present disclosure, the following terms shall have the following definitions:

Character or "player character"—a persona created and controlled by a player in a video game.

Avatar—the virtual representation of a player character.

Character Account—an account that tracks character attributes.

Credit Card—a credit instrument issued by a real or virtual world institution to a player that allows the player to make purchases by providing an account identifier (e.g. a credit card number) rather than cash or other currency. An example is a credit card like those issued by Visa, MasterCard, or American Express. For the purposes of the present disclosure, the term "Credit card" is intended in a very broad sense and is not limited to those situations in which a player's purchases are made on credit (i.e. where payments for those purchases is not due until a later time) but also includes financial instruments such as debit cards, check cards, lines of credit and the like.

Total virtual obligation amount—the total amount of the virtual financial obligation(s) associated with a player character's account.

Virtual Contract—An enforceable agreement between a first player character and either another player character, a game server, or a third party. Some examples of virtual contracts are provided in U.S. Provisional Patent Application Ser. No. 60/652,036, which is hereby incorporated by reference in its entirety for all purposes.

Virtual—shall mean in a video game environment or other intangible space.

Virtual World—a world created in an online game such as World of Warcraft, or a virtual community such as Second Life, Eve or There.com.

Virtual Creditor—shall mean a first player character or other entity who is owed a virtual obligation by a second player character.

Virtual Credit Score—a score given to player characters in a video game based on one or more of the following criteria: the virtual assets they possess, the age of the character account, the type of account, e.g. basic or premium, the available credit line of the credit card associated with the account, the existing virtual financial obligations of the player character account, the player character's payment history including days to pay, amounts overdue or delinquent, and/or the player character's real world credit score, and/or the factors used in the real world to determine a credit score.

Virtual Financial Account—a virtual account issued to a player character by a virtual bank, game server or third party where virtual cash can be deposited and withdrawn.

Virtual Financial Obligation—An agreement by a player character or entity to pay one or more game attributes to another player character, entity or the game server. This obligation can be a one time payment, or may require multiple payments over time. The obligation may specify when payments and/or interest are due.

Virtual Financial Intermediary—Financial intermediaries are institutions including depository institutions, contractual savings institutions, and investment intermediaries which offer financial products and services for use within the virtual environment. The various financial intermediaries available in the virtual environment may each serve different or overlapping purposes and provide means for using, saving, borrowing and transferring currency.

Virtual Financial Obligation Value—the in game value of the obligation. For virtual cash the value may be stated as a virtual and/or real cash amount. For other game attributes, the value can be determined by generating a virtual cash market value for the item based on the current value in an online marketplace or exchange. The value of the obligation may be fixed or variable and may also be set as a condition of the player contract and/or by the game server or other entity.

Billing Information—shall mean any information pertaining to billing a player for playing a game, accessing a game, purchasing goods or services, or any other reasons. Billing information may include such real world information as a billing address, credit card account number, bank account number, pay pal account number or other payment facilitator, or the account number of any other financial entity providing a real world credit line or any other payment-related information.

Virtual credit card—a financial instrument issued in a virtual environment that acts in the virtual environment for virtual currency the way a real world credit card acts in the real world for real currency.

Real Cash Value—the value in real dollars of the virtual currency. This value can be determined by multiplying the value of a virtual currency amount by the current exchange rate to real dollars.

Character Attribute—any quality, trait, feature or characteristic a particular Character can have that is stored in the corresponding Character Account. Character Attributes may include, but are not limited to: 1. A character score 2. A virtual object 3. The physical appearance of a character 4. An emblem or mark 5. A synthetic voice 6. Virtual currency 7. Virtual help points or credits 8. The ability to join groups of other players at a later time 9. A score for subsequent matching of later game parameters 10. A relationship with another character 11. A genetic profile or makeup 12. A skill or skill level 13. A ranking Character Life—a fixed or variable, finite or infinite period of virtual or real world time that a player character can exist in a game environment.

Character Skills—game attributes inherent in or acquired by a player character during game play such as, but not limited to: the ability to cast (certain) spells, foretell the future, read minds, use (certain) weapons, cook, hunt, find herbs, assemble herbs into portions, mine, assemble objects into other objects, fly, and/or enchant other player characters.

Computer Generated (CGC) or Non-Player (NPC) Character—any character that is controlled by the game system and/or a computer program and/or rules established by the game system and/or a player and not by a player on a continuous basis.

Game performance parameter—any aspect of a Video Game by which a player character's performance can be measured. Game Parameters shall include, but not be limited to: 1. Completing all or part of a mission 2. Playing for a certain period of time 3. Winning a match against another player character or computer generated character 4. Reaching a certain level or score 5. using or obtaining an ability or technology 6. kill/death ratios 7. obtaining, creating or modifying an object 8. solving a puzzle 9. accuracy with weapons 10. effective use of the proper weapon 11. killing a certain character/creature 12. getting through or to a certain geographic area 13. decreasing or increasing Karma Points 14. getting, buying, exchanging or learning a new skill or player attribute 15. having a child 16. getting married 17. obtaining, buying, trading, producing or developing raw materials 18. producing goods or services 19. earning income 20. earning a higher rank in an army 21. winning an election among two or more player characters 22. achieving deity or other status 23. improving player character status or caste 24. assisting other player characters with any of the above 25. speed of accomplishing or changing the rate or trends of any or all of the above.

In-game Marketplace—shall mean a virtual environment where Characters can exchange items, attributes, or any other exchangeable game element.

Novice Player—shall mean a player that is identified as requiring the help of an expert to complete a Game Parameter.

Player—shall mean an individual who can register an account with a Video Game Central Server or within a peer-to-peer network and create Characters that can interact with other Characters in a Virtual Environment, and/or that can authorize a NPC to act on the player's behalf.

Player Account—shall mean an account on the Video Game Central Server or within a peer-to-peer network that contains a Player profile including personal, billing, and character account information.

Player Attribute—shall mean any attribute that can be applied to a player account. Player Attributes shall include, but not be limited to: 1. Real Currency. 2. Discount of monthly fees for playing game. 3. Monthly fee for playing a game. 4. Interest rates for use of or borrowing real or virtual cash amounts. 5. Global character attribute settings for all characters created by player across multiple games. 6. Rewards for encouraging another player to signup to play.

Player to Player Contract—a real and/or virtual but binding contract between player characters that allows the players to provide or exchange game attributes to one another. Once a player-to-player contract is established, the game server or peer-to-peer network automatically distributes acquired game attributes between the player characters based on the contract conditions.

Video Game—a game played on a Video Game Consul that may or may not be networked to a Video Game Central Server or within a peer-to-peer network.

Video Game Consul—a device comprising a CPU, memory and optional permanent storage residing at a player location that can allow for the playing of video games. Examples include, home PCs, Microsoft Xbox, and Sony Playstation.

Video Game Central Server—a CPU, memory and permanent or temporary storage that is connected to multiple Video Game Consuls that allows for Massive Multi Player Online Video Games to be played.

"Game Environment"—a particular level or area within a virtual world. Each game environment may have its own rules, regulation, currency, government, managers, etc. Game environments may exist within other game environments.

Video games which are accessible to multiple players via a server or peer to peer network are well known. For example, hundreds of thousands of players access games known as massive multi-player online games (MMOGs) and massive multi-player online role playing games (MMORPGs). Players of these games customarily access a game repeatedly (for durations typically ranging from a few minutes to several days) over a given period of time, which may be days, weeks, months or even years. The games are often constructed such that players pay a periodic subscription price (e.g., $15 per month) rather than, or in addition to, paying a one time purchase price for the game. Often, though not necessarily, these games have no ultimate "winner" or "winning goal," but instead attempt to create an enjoyable playing environment and a strong player community.

It would be advantageous to provide improved methods and apparatus for increasing the enjoyment and/or longevity of video games including, but not necessarily limited to MMOGs and MMORPGs.

Massive multi player online games (MMOGs) or massive multi-player role playing games (MMORPGs) are computer game which are capable of supporting hundreds, thousands, or millions of players simultaneously. Typically, this type of game is played in a giant persistent world where the game continues playing regardless of whether or not real players are logged in. Players commonly access these games through a network such as the Internet, and may or may not be required to purchase additional software or hardware in order to play the game. Such networks allow for people all over the world to participate and interact with each other in a virtual environment. The present disclosure provides systems and methods which contribute to the evolution and longevity of such a game.

The herein described aspects and drawings illustrate components contained within, or connected with other components that permit play in the virtual environment. It is to be understood that such depicted designs are merely exemplary and that many other designs may be implemented to achieve the same functionality. Any arrangement of components to achieve the same functionality is effectively associated such that the desired functionality is achieved. FIG. 1 provides an exemplary network which may be used to support a virtual environment.

Referring to FIG. 1, a network 10 according to one embodiment includes a central server 20 in communication with a plurality of video game playing units 18. Those of ordinary skill in the art will appreciate that any number of video game playing units may be in communication with the central server. Typically, the number of video game playing units changes at various times as players join games and as players stop playing games. Similarly, more than one server may operate to coordinate the activities of the video game playing units, as is well known in the art.

Central server 20 may comprise any computing device (e.g., one or more computers) capable of communicating with other computing devices. The server 20 typically comprises a processor which is in communication with a storage device, such as an appropriate combination of RAM, ROM, hard disk, and other well known storage media. Central server 20 may comprise one or more personal computers, web servers, dedicated game servers, video game consoles, any combination of the foregoing, or the like.

Each video game device 18 may comprise any device capable of communicating with central server 20, providing video game information to a player, and transmitting the player's desired actions to the central server. Each video game device typically comprises a processor which is in communication with a storage device, such as an appropriate combination of RAM, ROM, hard disk, and other well known storage media. Suitable video game devices include, but are not limited to, personal computers, video game consoles, mobile phones, and personal data assistants (PDAs).

Some or all of video game 17 can be stored on central server 20. Alternatively, some or all of video game 17 may be stored on the individual video game devices 18. Typically, the video game devices are able to communicate with one another. Such communication may or may not be facilitated by central server 20. Accordingly, a player 19a accessing video game 17 via game device 18a may be able to play with a player 19b accessing video game 17 via game device 18b.

As shown, it may be possible for multiple players (e.g. 19c, 19d) to access central server 20 via the same game device (e.g. 18c).

Regardless of whether video game 17 is stored on central server 20 or video game devices 18, server 20 is typically configured to facilitate play of the game between multiple game players.

Those having skill in the art will recognize that there is little distinction between hardware and software implementations. The use of hardware or software is generally a choice of convenience or design based on the relative importance of speed, accuracy, flexibility and predictability. There are therefore various vehicles by which processes and/or systems described herein can be effected (e.g., hardware, software, and/or firmware) and that the preferred vehicle will vary with the context in which the technologies are deployed.

At least a portion of the devices and/or processes described herein can be integrated into a data processing system with a reasonable amount of experimentation. Those having skill in the art will recognize that a typical data processing system generally includes one or more of a system unit housing, a video display device, memory, processors, operating systems, drivers, graphical user interfaces, and application programs, interaction devices such as a touch pad or screen, and/or control systems including feedback loops and control motors. A typical data processing system may be implemented utilizing any suitable commercially available components to create the gaming environment described herein.

While virtual environments as previously described allow for interactions between players, the amount and depth of interaction may be limited by the parameters of the game. For example, most virtual environments lack sophisticated financial systems. They therefore limit the capital raising ability of virtual entities such as game environments as well as potential investment opportunities for characters. This limits the scope of interactions available and inhibits growth and development of both the virtual economy and the virtual environment, decreasing the depth and enjoyment of play available.

Various embodiments of the invention address this issue by providing a means for raising funds for development in an online environment. Such a system allows for the development of the game and widens the financial opportunities available to players, increasing the enjoyment of the players and the sophistication of play available.

Funding may be sought for a variety of reasons including, but not limited to expansion plans, public works, construction, public services, development of infrastructure, the building of any virtual business, the promotion of any virtual business or event, the payment of a virtual design on any virtual product, the performance of one or more virtual services, or any of a myriad of other reasons for which exterior funding may be required. Such funding may be obtained through a variety of means both public and private including, but not limited to, taxes, fees, licenses, bond issuance, loans, investors, commercial paper, convertible debt, bills, notes, debt issuance, promissory notes, venture capital, the issuance of private shares, transforming the game environment into a public company through an initial public offering, or through a follow on offering such as the issuance of common stock, preferred stock, or treasury stock.

In one embodiment, a game environment may impose virtual taxes on the characters that play in that environment and/or businesses that operate in an environment. Taxes may be imposed using any means applicable and in any form suited to meet the purposes of the game environment imposing the taxes. Taxes may be direct or indirect. They may be ad valorem taxes such as sales taxes, tariffs, property taxes, inheritance taxes, and value added taxes. Tax rates may be progressive or flat. There may be income taxes, retirement taxes, capital gains taxes, corporate taxes, poll taxes, excises, toll taxes, use taxes, transfer taxes, inheritance taxes, and wealth taxes. Such taxes may be flat fees, percentages, or a combination thereof.

In another embodiment, the virtual tax system could be a lottery. The virtual governing body could set the lottery ticket price, where the funds are allocated, the percentage of the collected funds that will be distributed to the winner, and the method of distribution. The winning number or other indication of winning could be determined by an independent party or by the governing body. In one embodiment, the funds that are not distributed to the winner could be used to fund virtual public works.

In a further embodiment, a game environment may charge fees or require licenses for certain virtual services. For example, fees may be charged to open virtual businesses. There may be exchange fees, servicing fees, credit verification fees, processing fees, insurance fees, application fees, late payment fees, prepayment fees, etc. For example, a player or virtual business interested in providing financing options may be required to have a premium account or may be required to pay a fee. In another embodiment, characters providing certain services such as virtual exchange trading may need to pay a licensing fee in order to represent other characters. Fees may be flat fees, per transaction fees, a fee based on a percentage of the transaction or any combination of the above.

In one embodiment, fees may be charged for the use of the virtual project being funded. For example, residents of a game environment may be assessed a fee for the construction of a virtual public work from which they will receive the benefit. In another embodiment, characters could be charged a fee for the use of a virtual public work and such fees could be used to construct other virtual public works. Fees may be a flat fee, a per transaction fee, a percentage fee, or a combination thereof. In yet another embodiment, those who helped fund the virtual public work, will not be charged a fee or may be charged a reduced fee to use the virtual public work once it is completed, while those who did not contribute to its construction would be charged a larger fee. Such rights to reduced or eliminated fees may be marketable, inheritable, or attached to the character who paid the initial fee. An evaluation of such rights and an assessment of the necessary fee could be made using one or more of the following steps: 1. Determine that a player has used a virtual asset. 2. Determine if player assisted in funding the virtual asset. 3. Determine a fee for using the virtual asset based on whether or not and to what degree character funded the creation of the virtual asset. 4. Output fee to player. In another embodiment, the character could request to use the virtual public work and be assessed a fee using some or all of the following steps: 1. Receive a request to use a virtual utility. 2. Determine a usage fee and a registration fee. 3. Output fees. 4. Receive payment for fees. 5. Register player or group of players to use utility, including player character credit card to be charged if virtual cash is not available for fee. Fees could also be assessed automatically, for example using some or all of the following steps: 1. Determine a virtual cash fee is due for using a utility; 2. withdraw virtual cash fee from account(s) of player character or group of player characters using the utility. If the virtual cash fee is not available, then some or all of the following steps could be used to obtain fees from other sources: 1. Determine real cash value for the utility fee. 2. Retrieve credit card associated with player character. 3. Charge real cash value to credit card. 4. Convert real cash into virtual cash. 5. Deposit virtual cash into account.

In a further embodiment, a game environment, including a business, may obtain funds from third parties on a temporary basis. Funds may be lent through the issuing of virtual bonds, virtual governing entity securities, and virtual consumer and commercial loans or by any other means typically used to advance funds.

It is to be understood that players may control one or more characters and each character may apply for and obtain one or more loans. Additionally, groups of characters may come together and apply for loans. In some embodiments, a player character may be limited from lending currency to himself, another player character controlled by the same player, or a player character that is a family member, guild member, or affiliated in some way with the lending player character. For example, a virtual state run virtual bank may be prohibited from lending money to the virtual state that controls it.

For ease of description, the term "bank" is used throughout the present disclosure when describing an exemplary embodiment of a financial intermediary or other lending entity which may function as a lending institution, however it is understood that the processes as described herein may apply to any type of financial intermediary or lending institution and the types of services they generally provide in the real world. Virtual banks are described, for example, in co-pending U.S. patent application Ser. No. 11/421,263, filed May 30, 2006 and Ser. No. 11/535,585, filed Nov. 27, 2006, each of which is hereby incorporated by reference.

A virtual loan may be obtained by applying for a loan, receiving the terms of the loan, agreeing to the terms of the loan and receiving the funds. An exemplary system 100 configured to provide the virtual environment described above is shown in FIG. 2. As shown, system 100 may include a game server 102, a bank server 104, and a credit card server 106.

Game server 102 may include a Loan Creation Program 108, whereby a bank server or other third party can register a loan with the game server. Game server 102 may further include a Loan Payment Program 110, a Loan Converted to Shares of Asset Program 120 and a Loan Registration Program 122. Bank Server 104 may equally be any other financial intermediary server including a contractual savings institution or investment intermediary server. Such servers 104 may include a Loan Generation Program 126, a Register Loan with Game Server Program 130, a Loan Payment Program 138, a Ping Credit Line 140, a Prohibit Sale of Virtual Assets Program 142, a Release Credit Line when Loan is paid 144, and a Loan Converted to Shares of Asset Program 154. Bank server 104 may additionally include databases such as loan account database 170 and account database 174. Credit Card Server 106 may include a Lock Credit Line Program 158, a Release Credit Line 162, and a Ping Credit Line program 164.

Loan Generation Program 126 may create a loan using some or all of the following method steps: 1. Receive a request to borrow virtual cash including a player character ID and a real world account number. 2. Validate real world account number and credit line amount. 3. Determine a virtual loan amount based on credit line amount. 4. Determine an interest rate and virtual payment schedule. 5. Output a virtual loan offer including a virtual cash loan amount, virtual interest rate and virtual payment schedule to player character. 6. Receive acceptance of virtual loan offer from player character(s). 7. Lock real world credit line. 8. Create new virtual loan record. 9. Output virtual currency to game environment account. In one embodiment, the virtual loan may be registered with the game server using loan registration program 122. In another embodiment, a credit line provided may be locked using lock credit line program 158. In a further embodiment, information regarding repayment of a loan may be stored using loan payment program 110. All information regarding the virtual loan may be stored by any means applicable, for example in loan account database 170.

In one embodiment, the virtual loan may be the sum of the credit lines a group of player characters are willing to make available on their credit card accounts to secure the loan. In another embodiment, a game environment may borrow funds based on its own standing without the security offered by the player characters controlling the game environment. A game environment may have its own accounts, its own funding, and may be evaluated based on its own history, creditworthiness or other valuation.

Virtual loans may be secured or unsecured. An unsecured loan is a loan that is issued and supported only by the borrower's creditworthiness, rather than by some sort of collateral. A secured loan is a loan which is backed by collateral. Such collateral may belong to the character or game environment seeking the loan or to a third party. The collateral may be a real world credit line supported by a real world financial institution, a real world financial security, a real world asset, a virtual financial institution, a virtual credit line, a virtual financial security, a virtual property or business, a virtual asset, a real world property, a promise to perform certain services or any combination thereof.

In one embodiment, the collateral is a real world credit line. Each player may indicate the amount of collateral in the form of the real world credit line he is willing to allocate against the virtual loan. Such a real world credit line may be a credit card, debit card, private or public payment facilitator account (i.e. paypal), brokerage account, equity line or other financial security and/or the financial security of another player character and/or a non-playing third party, such as a bank, credit institution, credit card company, mutual fund, hedge fund, insurance company, etc. or any combination of these or any other type of real world financial instrument or institution that provides a credit line or holds or secures assets for third parties.

According to one embodiment, real world credit lines can be frozen by the bank owner or game server, and/or just periodically "pinged" to ensure their validity and that sufficient credit is available to underwrite the loan. The continuing availability of the real world credit line may be determined by any means applicable. According to one embodiment, Ping Credit Line program 138 may be configured to complete some or all of the following steps: 1. Determine that a player character has an outstanding virtual loan. 2. Determine real and virtual cash value of loan. 3. Retrieve credit card associated with loan. 4. Ping credit card for the outstanding real cash value of the loan amount. 5. If credit equal to loan amount is not available. 6. Liquidate virtual assets of player character equal to virtual cash value of virtual loan. 7. Deposit virtual cash in loan account to pay off loan. The "ping" from the bank server may be responded to by ping credit line program 164 on the credit card issuer server.

In the event a credit line securing the virtual loan is cancelled or closed, the system could receive notification that the credit card or credit line is no longer valid. Upon notification that a credit line is no longer valid, the bank, system, game owner, server owner, or other debt holder may require payment in full of the virtual loan, require the player to provide a new credit line, require additional collateral to secure the virtual loan, secure a secondary line of credit which was previously provided or may be secured from other player characters, notify other characters of the opportunity to purchase a virtual loan, foreclose on virtual assets held by the defaulting character, freeze the virtual accounts of the character or player, or any combination thereof. In another embodiment, the balance of the virtual loan may be reallocated among the remaining credit cards securing a group loan.

The lock on the real world credit line may be released when the virtual loan is repaid. According to one embodiment, Release Credit Line when Loan is Paid program 144 may be configured to: 1. Receive indication that final payment of virtual loan has been received. 2. Retrieve credit card associated with virtual loan. 3. Notify credit card issuer to release credit line.

Alternatively, as the virtual loan is paid down, a percentage of the real world credit line(s) may be released in proportion to or in some other ratio with the amount paid. In this example, the real world credit line held is reduced as the virtual loan is repaid, instead of waiting for the entire virtual loan to be repaid, thus freeing real world credit lines for other purposes. Such a release could be managed by any means available. According to one embodiment, Release Credit Line when Loan is Paid program 144 may be configured to: 1. Receive indication that a periodic payment of virtual loan has been received. 2. Retrieve credit card associated with virtual loan. 3. Notify credit card issuer to release an equal or other determined portion of the credit line. Management of information regarding payments which would trigger Release Credit Line when Virtual Loan is Paid program 144 may be controlled by Virtual Loan Payment program 138. This program may then instruct the credit card issuer server to release the credit line using Release Credit Line program 162.

A real or virtual credit line can secure the virtual loan payment amount, the entire virtual loan amount, or a ratio of the two. In calculating the amount to be secured factors such as game growth rates, taxes, inflation and/or exchange rates, credit worthiness of the character or player, riskiness of the venture or purpose of the virtual loan, the amount of debt the character, player or game environment has outstanding, or any combination thereof may be considered in determining the total amount to secure on the real world credit line. Such determinations and evaluations may be made by a) the game manufacturer, b) the owner(s) of the server(s) upon which the game resides, c) one or more player characters, d) market forces, e) negotiation among the affected parties, any combination of the above. Information regarding the credit lines used to secure a virtual loan may be stored by any means applicable. In one embodiment, such information may be stored in Account database 174.

In one embodiment, the amount of a real world credit line to be frozen can be based on the exchange rate of virtual currency for real currency. According to one embodiment, the exchange rate could be one for one. Alternatively, the exchange rate may be based on the exchange rate at the time of the formation of the loan. It may also be based on the exchange rate at the time the player's credit card or other credit line is charged. In another embodiment, the exchange rate may be adjustable for the term of the loan. Such adjustments may be based on inflation, actual exchange rates, market forces or other economic indicators or a combination thereof. The exchange rate may be fixed in that the rate does not change for the duration of the game or segment of the game. Alternatively, the exchange rate may be pegged to a floating real world exchange relationship, for example the U.S. dollar/Japanese yen spot exchange rate, a percentage thereof, a plus or minus adjustment thereof, some other economic indicator, or a combination thereof. The exchange rate may also vary depending on the country of origin of the player, or may be fixed to a particular real world currency, i.e., all exchange rates are quoted in dollars. In another embodiment, the exchange rate may be floating and determined by market forces such as the relative demand for virtual currency versus real world currency. Said exchange rates may further be established or determined by any suitable method including, but not limited to, by a) the game manufacturer, b) the owner(s) of the server(s) upon which the game resides, c) one or more player characters, d) market forces, e) negotiation among the affected parties, f) any combination of the above. The exchange rate may also be composed of any combination of the above methods. For example, the exchange rate could be fixed for a certain length of time and then change to market forces or vice versa. Alternatively, there may be a cap on the amount of fluctuation in the exchange rate during the term of the loan.

In the event of a default, the credit cards or other credit lines used as collateral may be charged according to any of a number of criteria including, but not limited to, charging all of the credit cards used to secure the virtual loan in equal percentages until the credit line is maxed out, and then in an equal percentage on the remaining credit lines until no credit line is available; in an order designated by the virtual loan agreement, i.e. charge credit card A first up to a fixed amount, then charge credit card B, etc.; or in a ratio specified under the loan agreement.

Alternatively or additionally, the collateral may be a non-financial asset. Such an asset includes any item of economic value including, but not limited to, a virtual object; a virtual skill or attribute; virtual property or business; a real world object or property; a promise to perform certain services, or any combination thereof. In one embodiment, the collateral is the natural resources and/or building materials used to construct the virtual project. In another embodiment, the collateral may be a collection of assets held in escrow. In the event of a default, such assets may be sold or otherwise liquidated.

In one embodiment, the bank or other party providing the virtual loan may desire part ownership in an asset in return for the virtual loan. For example in one embodiment, the virtual loan could be structured so that it is convertible for a percentage ownership of the virtual item or asset that it was used to purchase or construct (and/or in addition to additional assets and/or penalties). In this embodiment, the player characters that took out the virtual loan or the bank that issued the virtual loan can convert the virtual loan obligation into a percentage ownership of the asset(s) that the virtual loan was used to purchase or create. The terms of the conversion could be specified in the virtual loan agreement and the conversion rate may change over time as the virtual loan balance is reduced.

In another embodiment, the bank or other party may take ownership in the game environment. Ownership could also be conferred in the issuance of shares or stock options. Such ownership may include anti-dilution provisions, or other provisions designed to protect the stake of the bank or other lending entity. For example, in the event that the percentage is in stock or stock options, the bank may limit the amount of stock the virtual business may issue such that the percentage ownership does not become diluted. In another embodiment, the bank may receive a percentage of stock or stock options in the virtual business with each issuance of new stock. This decision can be made by the game server based on the venture and the player character credit scores or real world credit line and/or manually. The conversion of the virtual loan to a security or other arrangement may be managed by Loan Converted to Shares of Asset program 154.

In another embodiment, the bank could obtain possession of the entire virtual item or asset in the event of a default. The bank could then sell or otherwise dispose of the virtual asset.

Such information or proceeds may be stored by any means available. According to one embodiment such information is generated through Loan Converted to Shares of Asset program 120 which may be configured to perform some or all of the following steps: 1. Receive a request to convert all or a portion of an outstanding virtual loan into shares of a virtual asset by a virtual bank server or player character. 2. Retrieve and amend loan obligation. 3. Retrieve and amend ownership structure of virtual asset. 4. Notify loan parties and owners of asset that virtual loan has been converted into shares of a virtual asset.

The terms of the virtual loan may include interest. The interest rate may be fixed in that the rate does not change for the duration of the game or segment of the game. Alternatively, in another embodiment, the interest rate is pegged to a floating real world or virtual world interest rate, a percentage thereof, or an interest rate plus or minus a particular sum (i.e. prime+/−2%). An exemplary real world interest rate would be the three month U.S. treasury bill yield to maturity. In another embodiment, the interest rate may be determined by market forces such as exchanges in the virtual or real world or other economic indicators. Said interest rates may further be established or determined by any suitable method including, but not limited to, a) the game manufacturer, b) the owner(s) of the server(s) upon which the game resides, c) one or more player characters, d) market forces, e) negotiation among the affected parties, f) the availability of funds, g) the current or predicted real or virtual credit score of the player, h) the current ratio of bank funds on deposit vs. the total amount of loans, i) payment performance, j) adherence to loan restrictions or other terms, k) number of initial or subsequent defaults on loans by the player character, l) real or virtual credit scores, m) any other financial or other terms as determined by the lender and agreed upon by the borrower n) by any real world or virtual rule, law or regulation, or o) any combination of the above.

In another embodiment, interest rates may be customized on the basis of risk: i.e. reasons for or uses of the proceeds of the virtual loan; the financial or business plan underlying the virtual loan; default rate of the borrower(s); credit worthiness of the borrower(s); type of virtual investment pursued by the borrower(s); portfolio of the bank; outstanding loans of the borrower(s) or the game environment; how much currency the bank has available to lend; costs to the bank for obtaining the currency; the term of the virtual loan; or any combination thereof. Evaluation of the risk may be determined by a) the game manufacturer, b) the owner(s) of the server(s) upon which the game resides, c) one or more player characters, d) market forces, e) negotiation among the affected parties, or f) any combination of these.

In charging interest, the game or virtual bank server may periodically determine an average balance over a fixed time period, multiply the balance by the specified interest rate and charge the virtual interest rate to the account. Such compounding time periods may be continuously hourly, daily, weekly, monthly, yearly or as determined by a) the game manufacturer, b) the owner(s) of the server(s) upon which the game resides, c) one or more player characters, d) market forces, e) negotiation among the affected parties, f) any real world or virtual rule, law or regulation, or g) any combination thereof.

According to another embodiment, some virtual loans may have priority over other virtual loans, i.e., if a player character enters bankruptcy or otherwise defaults on any virtual loan, some virtual loans may recover from the assets of the player character before those of other virtual loans. Priority of virtual loans may be established at the time the virtual loan is secured and/or based upon the date secured, for example, giving preference to virtual loans secured earlier over those secured later. Priority may also be granted based on the type of virtual loan obtained, or the type of underlying assets used to secure the virtual loan. For example, a virtual loan used to purchase property may have priority over a virtual loan used to purchase a disposable asset or vice versa.

In another embodiment, the game environment, including a business may issue virtual bonds in order to raise capital. A bond is a long term debt security in which the issuer owes the holders a debt and is obliged to repay the principal and interest (the coupon) at a later date, termed maturity. A game environment may issue any type of bond found in the real world as well as types of bonds that are only found in the virtual world. For example, a game environment may issue bonds such as, but not limited to, fixed rate bonds, floating rate notes, high yield bonds, zero coupon bonds, convertible bonds, inflation linked bonds, indexed bonds, equity linked notes, asset backed securities, including, but not limited to mortgage-backed securities, collateralized mortgage obligations, collateralized debt obligations, subordinated bonds, perpetual bonds, bearer bonds, open-end bonds, debentures, mortgage bonds, closed end bonds, equipment trust certificates, and book-entry bonds. Such bonds may be collateralized by real or virtual assets or may have no collateral.

In one embodiment, for example in the funding of virtual public works, the residents of a game environment may vote to have a virtual bond issuance. For example, a virtual governing body may output a list of virtual public projects for which they are seeking funding. Virtual residents may vote on the virtual projects they want to fund or are willing to pay for, and virtual projects which are not selected do not get funded. Such a process could be completed using some or all of the following steps: 1. Output a request for a bond, including a project description and budget. 2. Receive votes on bond. 3. If majority of votes favor bond, flag bond and associated project as approved.

An exemplary system 200 configured to provide the virtual environment described above is shown in FIG. 3. As shown, system 200 may include a game server 202, a bank server 204, and a credit card server 206.

Game server 202 may include a Bond Creation program 212. Game server 202 may additionally include one or more databases including Player Database 216, Character Database 218, Game Environment Database 220, Bond Database 224, Utility Database 228, and Utility Conditions Database 230. Bank server 204 may equally be any other financial intermediary server including a contractual savings institution or investment intermediary server. Such servers 204 may include a Bond Payment Program 238 and databases such as Bond Database 234 and a Utility Fee Database 236. Credit Card Server 206 may include an Account Database program 242.

According to one embodiment, the game server and the bank server may be the same server and the method steps for creating and managing utilities and bonds can be divided between the two. For instance, bond creation can be the responsibility of the bank server and registration and fees can be managed by the game server or vice versa.

Bond creation program 212 may be used to format and manage a bond issuance. Information regarding virtual bonds may, for example, be stored in Bond Database 224. Player database 216 may include information such as, but not limited to, player ID, the character(s) controlled by the player, billing information and personal information. Character database 218 may include information such as, but not limited to, character ID, player ID, assets, skills, obligations, and game environment access. Game environment database 220 may include information such as ownership, debt, assets, outstanding shares, outstanding bonds, government, natural resources, etc.

In one embodiment, bond creation program 212 may assemble an issuance request using some or all of the following steps: 1. Receive a group registration. 2. Receive a virtual Utility plan blueprint and project timeline. 3. Receive a virtual Utility business model, including fees for using a virtual utility and number of potential player character users. 4. Determine a credit card payment method in the event of a dividend or bond payment default. 5. Generate a list of virtual resources and services required to complete virtual utility based on blueprint. 6. Generate a virtual cash value for the virtual resources and services. 7. Create and store a virtual bond request based on the group, blueprint, timeline, business model, credit card payment method, resources, services and cash value. 8. Generate a bond request registration fee. 9. Charge fee to group account.

Virtual bonds may be issued with particular terms. Such terms include the interest or coupon rate, a face amount, a maturity date, and possible options. The interest or coupon rate may be fixed or variable. In one embodiment, the interest rate is pegged to a floating real world or virtual world interest rate, a percentage thereof, or an interest rate plus or minus a particular sum (i.e. prime+/−2%). An exemplary real world interest rate would be the three month U.S. Treasury bill yield to maturity. In another embodiment, the interest rate may be determined by market forces such as exchanges in the virtual or real world or other economic indicators. Said interest rates may further be established or determined by any suitable method including, but not limited to, a) the game manufacturer, b) the owner(s) of the server(s) upon which the game resides, c) one or more player characters, d) market forces, e) negotiation among the affected parties, f) the availability of funds, g) by any real world or virtual rule, law or regulation, or h) any combination of the above. In another embodiment, the interest rate may be partially fixed and partially variable. The coupon may be paid to the bond holder at any interval agreed upon at the time the bond is issued. For example, the coupon may be paid monthly, semi-annually or annually or on any other schedule.

In one embodiment, the virtual bond may have a nominal, principal or face amount which has to be repaid at the end. In another embodiment, a virtual bond may have an issue price at which investors buy the bonds when they are first issued. Virtual bonds may also have a maturity date at which time the issuer must repay the nominal bond. The length of time until maturity may be any length of time or the virtual bond may never mature.

In one embodiment, the virtual bond may have an embedded option. For example, the virtual bond may give the issuer the right to repay the bond before the maturity date (callable bond). In another example, some virtual bonds may give the bond holder the right to force the issuer to repay the bond before the maturity date. Options may be executed at any time, or only on specific dates. In one embodiment, the option may be a Bermudan callable in which the issuer may repay the bond on several dates. Such dates may coincide with the coupon dates or may be at other times. In another embodiment, the option may be a European callable in which there is a single specific date on which the issuer may pay the virtual bond early. In a further embodiment, the option may be an American callable in which the issuer may pay the virtual bond at any time until the maturity date. In yet another embodiment, if the issuer does not have the cash on hand to repay the bondholders when the virtual bonds mature, it maybe able to issue new virtual bonds and use the proceeds either to redeem the older virtual bonds or to exercise a call option.

An issuer may decide or be required to retire a certain portion of outstanding virtual bonds periodically. Such virtual bonds may be recalled randomly, recalled according to a specific system, or purchased on the open market. In another embodiment, the virtual bonds may be convertible in that they may be exchanged for a number of shares of the issuer's common stock. In a further embodiment, the virtual bonds may be exchangeable for shares of a corporation other than that of the issuer.

The issuance of virtual bonds may or may not require registration. Such registration may take place with the game owner, game server, or some other governing entity. Registration may require information such as the name of the issuer, the names of the characters or player controlling or managing the issuer, affiliates, underwriters, owners, marketing arrangements, financial statements, details regarding the type of securities being offered, the price, commissions, compensation, risk factors, use of the proceeds of the offering, assets of the game environment, significant milestones, or any other related information generally required in the real world for registration of an offering. Such registration may be stored by any means available, for example in bond database 224. In another embodiment, each virtual issuance may be registered with a bank which acts as a clearinghouse for the bonds. Information regarding a particular virtual issuance may be stored by any means applicable, for example in bond database 234.

In one embodiment, virtual bonds may be brought to market by the issuer, an underwriter or a syndicate. A syndicate is a temporary partnership of dealers which has been established to underwrite and sell a particular issue of bonds. The issuer may approach the underwriter directly, or an issuer may publish an official notice of sale to solicit bids. Such publication may be by electronic mail, regular mail, screen alerts, publication in a journal such as a real or virtual financial journal or any other means calculated to inform potential underwriters that an issuer is seeking to have a bond issuance. In one embodiment, a database may be created in which underwriters can indicate that they are interested in obtaining a bond issuance and issuers can indicate that they are seeking a bid. Such a database may be searchable, browsable, and/or may include a matching program that pairs issuers and underwriters. In one embodiment, an underwriter or syndicate may bid on an issuance.

The virtual bond offering may take place using a Dutch Auction, Firm Commitment, Best Efforts, Bought Deal or Self Distribution of Bonds. In a Dutch Auction, the auctioneer begins with a high asking price which is lowered in increments until some participant is willing to accept the auctioneer's price, or a predetermined reserve price is reached. The winning participant pays the last announced price. In Firm Commitment, an underwriter assumes all inventory risk and purchases all securities directly from the issuer for sale to the public at the price specified. With Best Efforts, the underwriter agrees to use all efforts to sell as much of an issue as possible to the public. The underwriter can purchase only the amount required to fulfill its client's demand or the entire issue. However, if the underwriter is unable to sell all securities, it is not responsible for any unsold inventory. In one embodiment, the underwriter has a set time frame for selling the shares. If all of the shares are not sold within the agreed-upon time frame, the issuer must return any funds collected from investors. In a Bought Deal, an investment bank negotiates a price with the issuer and purchases securities from an issuer before selling them to the public. The investment bank (or underwriter) acts as principal rather than agent and thus actually "goes long" in the security. Once the shares are initially sold, they may be traded on an exchange or other secondary market. In a further embodiment, the game environment or the owners of the game environment may self distribute the stock in a direct public offering. Once an underwriter or syndicate has won a bid, the syndicate or underwriter may sell the bonds.

The selling entity may receive orders for the issued virtual bonds. Orders may be presale orders received before the actual bid is submitted, group account orders for the group as a whole at the net offering price, designated orders which specify which syndicate members will receive a credit and member takedown orders which are orders from members for sale to the members' own customers. Once the virtual bonds are sold on the primary market in the initial offering, they may be traded on a secondary market such as the over the counter bond market. In one embodiment, virtual bonds can be bought in incremental units or percentage of the whole. For instance, player characters can buy 100 $1 bonds or 1% of a $100 bond.

In another embodiment, all or part of an issuance may be purchased using some of the following steps: 1. Receive an indication of interest to purchase all or a portion of a bond issuance. 2. Receive a virtual cash payment. 3. If virtual cash payment fulfills bond, notify group that bond request has been filled. 4. Issue virtual cash to group based on business plan associated with bond request.

Different virtual bonds may have different priorities, risks and repayment rates. In one embodiment, a virtual bond offering may include virtual bonds that are all of the same type. In another embodiment, the virtual offering may be in tranches or classes. Each tranche may have different ratings, and may or may not be secured by different assets, or may be unsecured. Subordinated bonds are those that have a lower priority than other bonds of the issuer in case of liquidation.

Once a bond is issued, payments may be required. Such payments may be the notional value, periodic interest payments, or retiring of all or a portion of the issuance. In one embodiment, payments may be made using Bond Payment Program 238. Such a program may use some or all of the following steps: 1. Determine that a virtual bond payment is due. 2. Withdraw virtual cash amount equal to bond payment amount from issuer account; and 3. Transmit bond payment to bond holders based on ownership structure and conditions Or 4. If virtual issuer cannot make bond payment, retrieve character accounts associated with group who registered virtual issuance, including credit card information. 5. Determine a real cash value for the virtual bond payment amount. 6. Determine a credit card charge method based on method specified by group. 7. Charge credit card(s) based on charge method until real cash value for the virtual bond payment amount has been collected. 8. Convert real cash to virtual cash and transmit bond payment to bond holders based on ownership structure.

A virtual bond issuance may take place using any means applicable and for any reason for which funding may be sought. For example, according to one embodiment, a game environment such as a city/corporation (or other group type such as guild, etc.) may seek to raise funds using a virtual bond issuance. Information regarding the city/corporation may be stored by any means possible, for example in Game Environment Database 220 and may include data such as: 1. Group ID 2. Character Members 1-n 3. Group Assets and Attributes A city/corporation may own, or have within the game environment a virtual utility such as water, gas, electricity, etc. or some other public work. The virtual Utility may be privately held or owned by the game environment. Such information may be stored by any means applicable, for example in Utility Database 228 and may include data such as: 1. Utility ID 2. Group ID(s) 3. Usage Conditions 4. Blueprint 5. Component (s) 6. Owners (s) 7. Ownership Percentage 8. Obligations Information regarding the virtual utility, its use, status, availability, capacity, or any other necessary information may be stored in Utility Conditions Database 230 and may include data such as: 1. Condition ID. 2. Condition Descriptor. 3. Utility types 1-n. The city/corporation may seek to upgrade the virtual utility or create an additional virtual utility through a virtual bond issuance. The issuance may be voted on and approved by the residents of the game environment. A virtual bond issuance may then be created and information regarding the bond issuance stored in bond database 234. Such information may include, for example, 1. Bond ID. 2. Bond Creation Date. 3. Bond Amount. 4. Group ID. 5. City/Corporation ID. 6. Utility ID. 7. Bond Amount. 8. Bond Conditions. 9. Bond Payment Schedule. Information regarding previous issuances by the same or different game environments, or for the same or different projects may be stored, for example in bond database 224. Such information could include, for example, 1. Bank ID 2. Utility ID 3. Group ID 4. Bond Conditions 5. Bond Creation Date 6. Bond Creation Schedule Charges for the use of the virtual utility, including use by those who did not contribute to the funding of the construction of the virtual utility may be stored in. Utility Fee Database 236 may include data such as: 1. Utility Fee ID 2. Utility Fee Descriptor.

Instead of obtaining a loan, issuing bonds, or imposing taxes or fees, a game environment, including an in-game or virtual business, may seek direct investment, for example through a venture capitalist, angel investor, hedge funds, leveraged buyout and merchant banking funds or a public offering. A game environment, including an ingame or virtual business, may approach a venture capitalist, angel investor, or hedge fund; venture capitalists, angel investors and hedge funds may seek out virtual investment opportunities; or a database may be created listing virtual investment opportunities and/or possible investors. Such a database may be searchable, browsable, or may provide a matching program based on criteria selected by the investors and or game environments seeking investors. Throughout this application, such direct investment funding sources are referred to as "venture capitalist funds" or "VC funds" though the methods and steps may similarly apply to other sources of funding such as angel investors, hedge funds or merchant banking funds.

Figure 4:
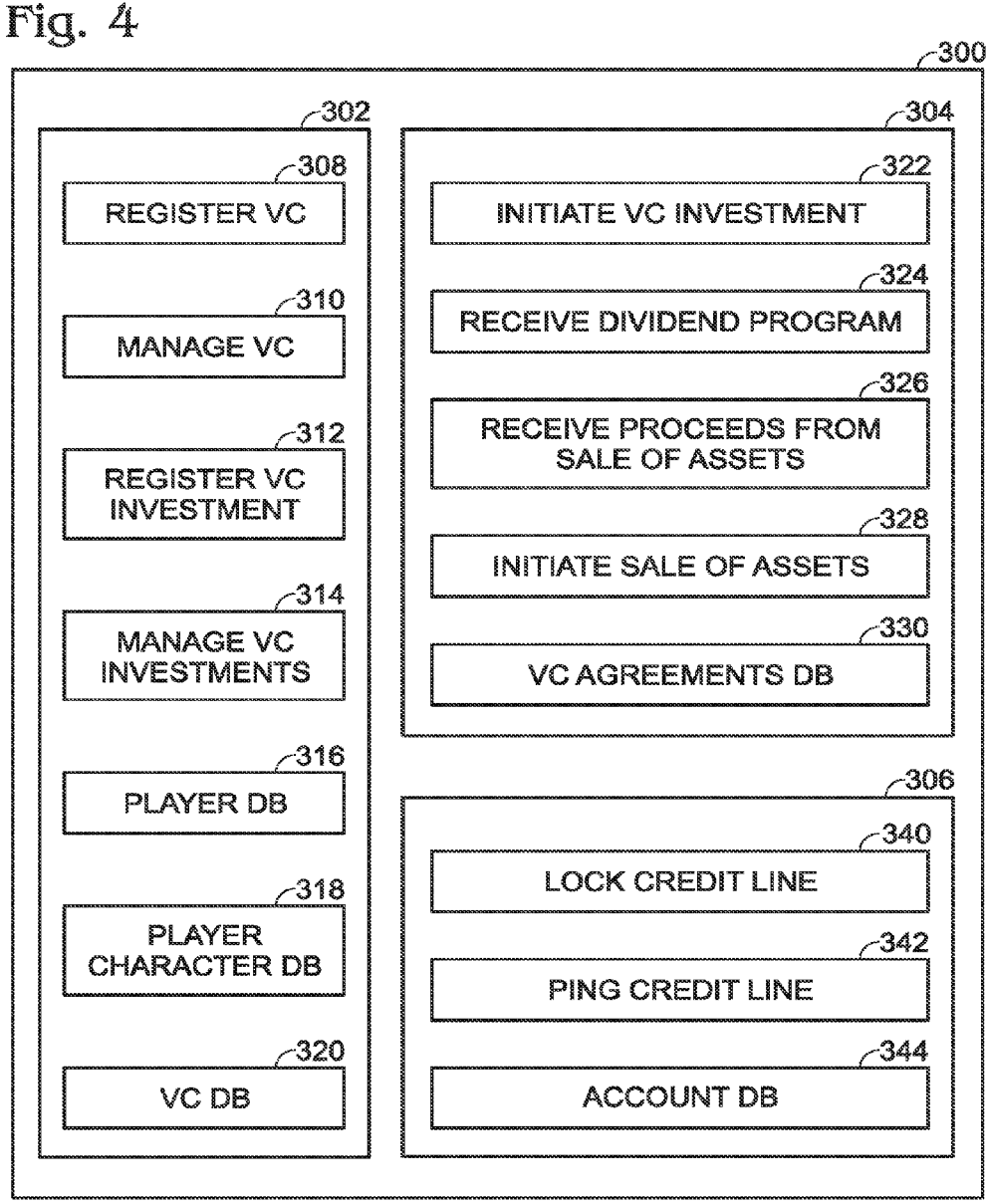
FIG. 4 depicts a system 300 according to an embodiment.
Figure 5:
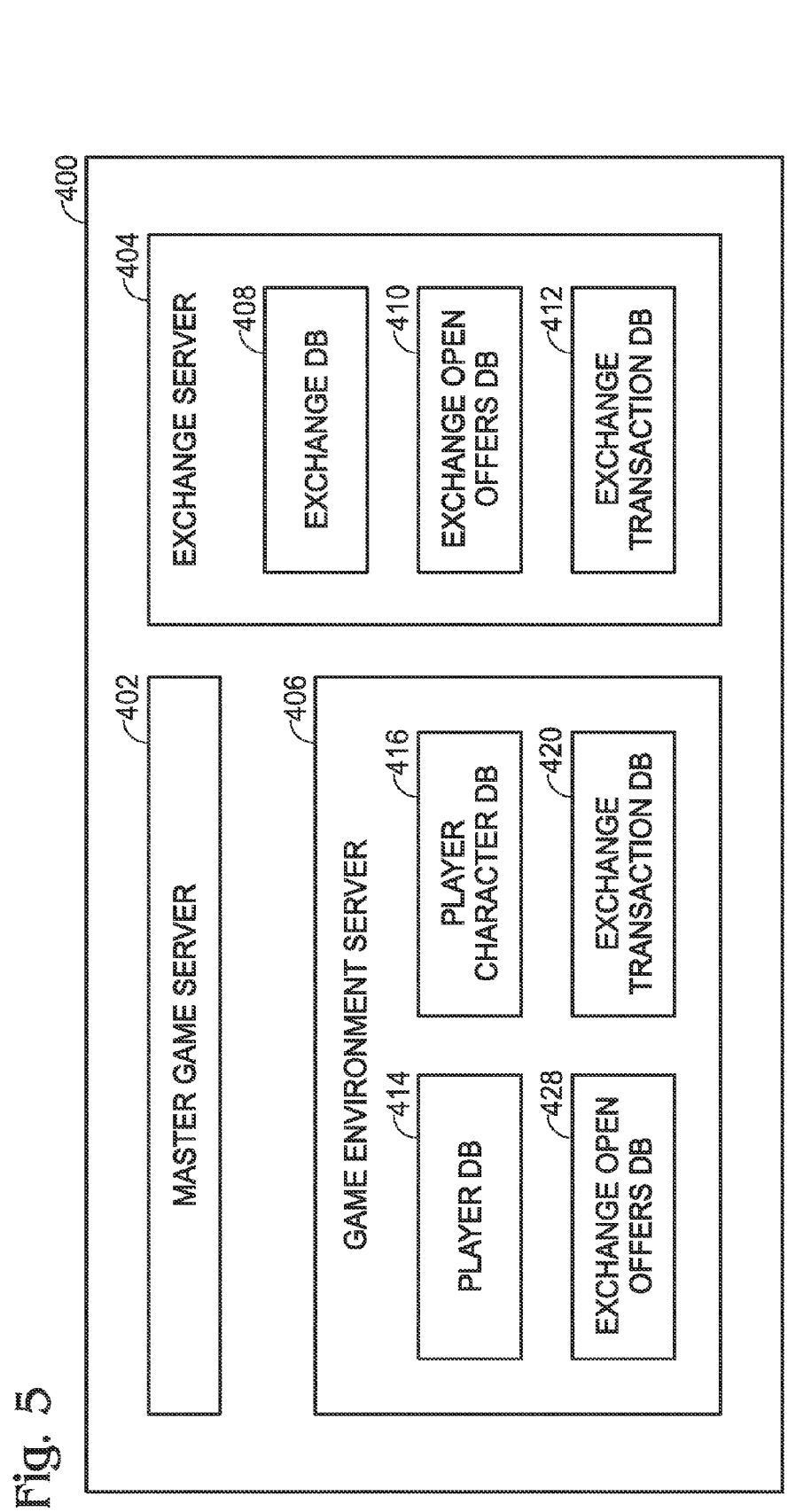
FIG. 5 depicts a system 400 according to an embodiment.

An exemplary system 300 configured to provide the virtual environment described above is shown in FIG. 4. As shown, system 300 may include a game server 302, a venture capital server 304, and a credit card server 306.

Game server 302 may include a register VC program 308, manage VC program 310, register VC investment program 312, manage VC investment program 314, Debit Card Issuance Program 319, Debit Card Usage Program 320, Credit Card Issuance Program 328 and Credit Card Usage Program 329. Game server 302 may further have one or more databases, such as, but not limited to, player database 316, player character database 318, VC database 320, Credit Card Database 324, and Debit Card Database 326. VC server 304 may include programs such as initiate VC Investment Program 330, Receive Dividend Program 332, Receive Proceeds from Sale of Assets Program 334, Initiate Sale of Assets Program 336, Fund Usage Program 339 and may include databases such as VC Agreements Database 338, Debit Card Database 335, and Credit Card Database 337. Credit card server 306 may include programs such as a lock credit line program 340, a ping credit line program 342 and an account database program 344.

Virtual venture capital funds may be in existence at the time of formation of the game, or may be created by one or more players, characters, or game environments. A virtual venture capital fund may be any form permitted by the game server, game owner, or other governing entity of the game or game environment. In one embodiment, a virtual venture capital fund may be a partnership, a private corporation organized as a limited partnership, a company taxed as a partnership such as an LLC, or any such similar organization as regulated by the game owner, game server and/or game environment. In another embodiment, there may be a general partner that may include the virtual fund's management company and investors which may be limited partners in the fund. Information regarding the characters involved in running and investing the venture capital fund may be stored, for example, in player character database 318. Information regarding the players controlling the characters involved in the venture capital fund may be recorded by any means applicable. In one embodiment, such information is stored in VC database 322 and/or player database 316. In a further embodiment, a bank or other financial intermediary may act as a VC fund, investing in game environments rather than providing loans. In another embodiment, there may be limitations on the number of virtual venture capital funds a character can participate in either as part of the management team, or an investor. Such a determination could be based on factors such as the monthly fee the player pays to play the game, i.e. if the player has a premium account; the age of the account; the skill level of the character and/or the virtual or real net worth of the player or player character. In a further embodiment, a bank or other financial intermediary may act as a VC fund, investing in game environments rather than providing loans. In another embodiment, a game environment such as a city may act as a VC fund, investing in internal development projects or business ventures or projects and business ventures in other game environments.

According to some embodiments, the game environment, a particular government, or a virtual land area governed by the game environment or by player characters may limit the number of virtual VC funds that can exist in the environment, or the number of particular types of investment funds that can exist in a particular game environment. Accordingly, there may be a licensing requirement and/or a limit on the number of licenses that are available at any particular time in a virtual environment. In some embodiments, if a virtual VC fund closes or becomes inoperable, the license may be forfeited and may revert to the governing entity such that it is available to a new entity desirous of starting a virtual VC fund, or it may be sold by the player character(s) that own it. The game server and any government formed by the game server or by a group of player characters may charge a tax or fee each time a license is issued or resold. Such fees could be up front, periodic, or any combination thereof. There may also be different types of virtual licenses which may have different limitations imposed upon them regarding the amount, type, and quantity of investments that can be made by a particular virtual VC fund.

The granting of a virtual license or the ability to open a virtual VC fund may be governed by certain regulations. Such regulations may be imposed by a governing entity, by a central institution, by the game server, game owner, server owner, or group of managing players. These regulations may impose certain requirements that must be met prior to the formation of a virtual VC fund. Such requirements may include, for example, the ability to pay a given fee, reserve requirements, availability of land and/or an appropriate building or other assets in the virtual environment, procurement of various suitable skills by the requesting group, particular organizational requirements, funding requirements, etc. In such a case, only those requests that come from an entity that is able to fulfill any imposed requirements will be granted a virtual license, if one is available.

The amount of the virtual license fee may be determined using any method suitable for the virtual environment. It may be established by the game itself, the owners or manufactures of the game, the game server, the owners of the server, a plurality of a predetermined number of players in existence at the time of the creation or acceptance of the license, by real and/or virtual law, or any combination thereof.

In another embodiment, a VC fund may need to be registered with the game server or other governing entity. Such registration may be independent of or in conjunction with a licensing requirement. Registration of a virtual VC fund and payment of a virtual license fee may be accomplished, for example, using Register VC program 308 which may use some or all of the following steps: 1. Receive a request to register a virtual Venture Capital fund including the VC owners, VC assets, VC location, and VC accounts. 2. Determine if a license is available for the VC. 3. If a license is available determine a permit price. 4. Output license price. 5. Receive acceptance of license price. 6. Create VC fund. 7. Output notice that fund is created. 8. Charge VC fund account the license price.

The management structure and running of a virtual venture capital fund may be ad hoc or may be dictated by organizational documents. Organizational documents may include such information as the time fixed for the fund's existence, an outline virtual investment decision-making, details regarding the involvement of the limited partners, descriptions of percentage ownership, guaranteed dividends, profit distribution, the ability to dissolve the partnership, the maximum virtual investment allowed in any single game environment, the use of virtual debt, re-investment of virtual profits, private investment by the general partner, future raising of capital by the general partner, virtual investments with other funds, the addition of other general partners, management fees, exit strategies for the funds investments or any other type of information generally found in such documents. In one embodiment, a virtual venture capital fund may be run by the game server(s). In another embodiment, a virtual venture capital fund may be run by a financial intermediary.

Enforcement of the organizational documents may be accomplished by any means necessary, for example using manage VC program 310. Information regarding the organizational documents may also be stored in a database such as a VC governance rules database which may include information such as the specific rule ID and a description of the rules for running the virtual VC fund.

Programs such as manage VC program 310 could execute the regulations of the organizational documents, pay any fees, update licenses, and otherwise manage the financial activities of the virtual VC fund. For example, manage VC program 310 could be configured to: 1. Determine that a VC must pay a license fee. 2. Output a notice to player character owners of VC that a license fee is due. If payment is not received, the game server or other governing entity may suspend the activity of the virtual venture capital fund.

Funding for virtual venture capital funds may come from any source applicable. In one embodiment, virtual venture capital funds may be funded upon creation by the game or game server. In another embodiment, virtual venture capital funds may be funded by characters, players, and/or game environments. In a further embodiment, a fund may seek funding from interested players, characters, game environments, or other third parties. Funding may be in real or virtual currency and/or real and/or virtual assets. Investors may be required to guarantee their funding using a credit line or some other source of collateral.

Figure 6:
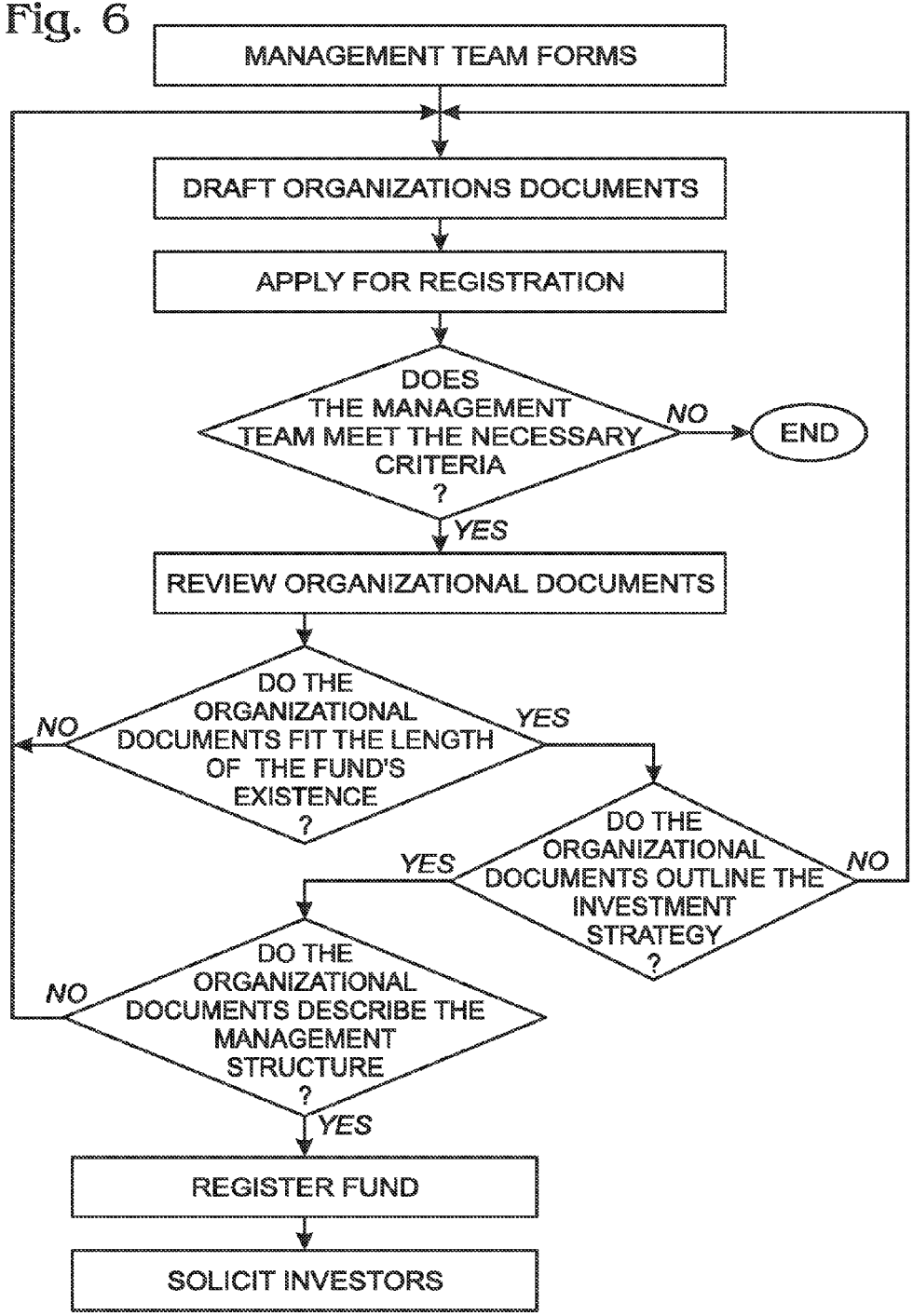
FIG. 6 depicts an embodiment of a method of forming a venture capital fund.

In one embodiment, a virtual venture capital fund may be formed as outlined in FIG. 6 in which a group of characters, institutions or game environments forms a management team to run a fund. The management team may consist of one or more characters. The management team drafts organizational documents describing the running of the fund and applies for registration of the fund. In one embodiment, members of management teams may need to meet certain criteria in order to run a fund. For example, they need to have certain types of accounts such as premium accounts, certain skills, a particular asset base, a particular level of experience, or any other criteria deemed necessary by the requirements of the game. Once the game server or other overseeing entity has verified that the management team is qualified, the game server or other overseeing entity may verify the organizational documents to determine that they fulfill the necessary requirements. In the embodiment in FIG. 6, the organizational documents are reviewed for management structure such as the involvement of the limited partners, or what type of organization the fund will be; the length of time the fund will be in existence; and the investment strategy of the fund. The parameters of the game may require some or all of these aspects as well as additional aspects be described in the organizational documents such as the other type of information described above. If the management team and the organizational documents meet the necessary standards, the fund will be registered with the game and may solicit investors. In alternate embodiments, investors may come together to form a fund so that the source of the funding is available prior to the formation of the management team.

According to one embodiment, game server 302 may be configured to create a virtual venture capital fund using some or all of the following method steps: 1. Receive a request from a player character, group of player characters, game environment, or one or more third parties to create a venture capital fund. 2. Review organizational documents. 3. Determine that organizational documents meet necessary criteria. 4. Create new venture capital fund with the requestors as owners.

The request to form a virtual VC fund may be made and received using any suitable method within the virtual environment. For example, the request may be sent via email, instant message, or via an on-screen request system. The request may be processed automatically by the server, by a paid or voluntary player or staff member, or though a combination of the above.

Information regarding the formation of a virtual venture capital fund may be stored by any means desired, for example on Venture Capital Database 322 and may comprise information such as, for example: 1. VC ID number 2. Owner ID numbers 1-n 3. Owner Percentages 1-n 4. Shareholder Percentages 1-n 5. Manager 1-n 6. Funding requirements 1-n 7. Financial Backing Accounts 1-n In a further embodiment, game server 302 may create a link between venture capital funds. Such a link may be used to form a network of related or co-owned institutions, to form a financial network to facilitate the transfer of funds between institutions, to link real and virtual financial accounts, to exert control by a central institution, any other reason for linking venture capital funds, or a combination thereof.

Once a virtual venture capital fund is in existence, whether formed by the game, by the owners of the server, or formed by players or player characters or otherwise, the fund may seek out or receive virtual investment opportunities. The acquisition of virtual investment opportunities may be accomplished by any means applicable. In one embodiment, such virtual investment opportunities are located using initiate VC investment program 330. In another embodiment, characters, game environments, players, or other entities may apply to a VC fund for funding. In yet another embodiment, members of a VC fund may propose investment opportunities to the fund. The virtual investments of a virtual VC fund including the type, quantity and amount, may be limited by their license, the rules of the game environment, the total virtual assets of a game environment, or any combination thereof.

In one embodiment, a virtual VC fund may need to register an investment with a governing body who may determine whether such an investment falls within the virtual license the virtual VC fund has obtained.

In another embodiment, the requirements of investment opportunities may be outlined in the organizational documents of the virtual venture capital fund. In one embodiment, a virtual venture capital fund may require an entity seeking investment to present a business plan. Such a plan may include information including, but not limited to, the market opportunity; products and services; the business model; the players or characters involved; the financials of the game environment including how much funding they are seeking; a positioning statement; operating expenses; revenues; earnings as well as any other financial information generally included in a business plan; prior sources of funding and uses of proceeds; exit strategy; dilution strategy including, but not limited to, current ownership interest, stock options, financings, convertible notes, warrants, common stock, and convertible preferred stock; assets; research on competitors; strategic alliances; milestones; market and customer research.

In a further embodiment, a valuation may be made of the game environment prior to investment by a virtual VC fund. The valuation may be requested and/or made by the virtual VC fund, the game environment seeking funding, or both. The value of game environments may be assessed by measuring any of a number of parameters including, but not limited to, the growth of the economy, the value of its natural resources, the amount of investment that is being made, the number of characters working or inhabiting the game environment, the amount of development that is taking place, the amount of land available for development, the amount of trade, the stability of the economy, taxes, cash flow, the assets of the inhabitants, the standard of living of the characters, the imports and exports into the economy, assets of the game environment, products sold by the game environment, services provided by the game environment, any other factor that is generally used to value an economy or any combination of the above.

In one embodiment, the value of a game environment is calculated according to the following equation: consumption+investment+government spending+(exports-imports). In another embodiment, the value of a game environment is determined by the final value of the goods and services produced by the resident characters in a given time frame. In a further embodiment, the value is determined by the market value of the goods and services produced by the resident characters minus the depreciation in a given time period. In yet another embodiment, the value may be calculated by: consumption+investment+government spending+(exports-imports)+net foreign factor income-indirect taxes-depreciation. In yet another embodiment, the value of the assets in a game environment may be assessed. Assets may be valued according to their market value, on a multiple of the underlying natural resource that can be salvaged from the asset, by a professional estimator whether real or virtual, by an investment bank or any other applicable valuation method or combination thereof. In a further embodiment, valuation may be determined by tax revenue or fees generated by the game environment. In another embodiment, cash flow from transactions in the game environment could be calculated. In one embodiment, earnings in the environment over a set period of time could be multiplied by a factor to arrive at a valuation. In another embodiment, valuation may be based on a listing of assets, liabilities and equity of the game environment. In a further embodiment, valuation could be determined by measuring cash distribution to owners using a discounted future dividend approach. In yet another embodiment, valuation could be determined using a discounted cash flow and discounted future net income approach. In still another embodiment, valuation could be determined using a market approach by comparing the game environment to similar game environments.

Valuations may also rely on conversion rates, factors or tables which may convert all assets to a common unit. Conversion rates may be determined by any means applicable. They may be fixed, on an automated trading system, or as determined by an exchange on the open market or any combination thereof. For example, conversion rates may be based on a comparison of the economies of two game environments, a comparison of a representative basket of goods, the number of player characters in each environment, the amount of a particular virtual asset available in a particular game environment, the amount of production of a virtual asset in the game environments or on any other number of market forces or comparable factors. For example, a gallon of oil may be converted to two gallons of oil when traded from War Craft® to Second Life®. In another embodiment, a barrel of oil may be converted into 1000 thistle seeds within a game environment, and/or a barrel of oil may be converted to 5000 thistle seeds when exchanged between two games. 5000 thistle seeds may be worth 3 shares of stock in a particular game environment. In a further embodiment, a conversion multiplier may reflect the difference in the labor (and/or other factors) required to build the game attribute in the first environment vs. the second environment. For example, 1000 thistle seeds in one game environment may be worth 700 thistle seeds in another game environment. Alternatively or additionally, the multiplier may take into account any differences in supply, availability, ease or cost of acquisition, or the like, of the resources and/or the prevailing exchange rates of real or virtual currency. Some game environments may be configured to produce items more optimally. These game environments may receive a premium valuation in that their labor is more efficient in that game environment than on other game servers. Alternatively, environments that produce such items more optimally may be penalized or a tariff may be imposed to create a more fair exchange between or among such game environments.

In one embodiment, some or all of the following steps may be used to convert assets between game environments: 1. Generate a conversion value for two or more game environments based on activity and conditions in the game environments. 2. Create a conversion multiplier based on the relationship of the values between two or more game environments. 3. Store multiplier.

Analysis of investment opportunities and the information provided by game environments seeking funding may be processed by any means applicable. For example, initiate VC investment program 330 may be used to review applications for funding. Such a process may use some or all of the following steps: 1. Receive a request to fund a virtual project from one or more player characters including a virtual project plan, virtual blueprint, a virtual cash budget, and amount of virtual cash necessary to complete the project. 2. Determine a project value based on the project request and the credit scores of the player characters. 3. Determine an ownership investment structure based on the value, and the credit scores of the player characters. 4. Output an investment offer, including an ownership percentage, a required dividend schedule, an investment payment schedule and other terms and conditions to the player characters. 5. Receive an acceptance of the offer. 6. Create a new virtual project including a virtual account and transfer appropriate virtual cash into project account. 7. Register agreement with Game Server.

In another embodiment, an investment decision may be put to a vote. An entity seeking funding may submit a request or other proposal whether written, pictoral or verbal and each proposal may be evaluated and put to a vote by the venture capital firm. In one embodiment, there may be certain minimum criteria which are required to be met before a proposal can be put to a vote. For example, the opportunity must be in a certain field, may need to be of a certain size, generate a particular rate of return, accomplish a particular goal, be in a particular game environment, or any other criteria the venture capital fund establishes. Such criteria may be evaluated by the members of the virtual venture capital fund or by a program, such as for example initiate VC investment program 330. In another embodiment, every proposal submitted must be put to a vote.

The decision to accept or decline an investment may be decided by any type of voting system. Such a voting system may be described in the organizational documents, may be dictated by the game, or decided by some other overseeing authority. It may be, for example, a single vote system, a multiple-round vote system, a multiple vote system, a ranked vote system, a scored vote system or any variation thereof.

In one embodiment, the voting system is a single vote system, in which each member may cast one vote. In a further embodiment, the voting system may be a multiple-round system. For example ten proposals are put to vote. In the next round the three proposals which received the most votes are voted on again. In the following round, the two proposals which received the most votes of the three are voted on again and the winning proposal is selected for investment purposes. In another embodiment, investment decisions may be made using a multiple vote system in which each member may cast as many votes as there are investment opportunities, and may cast one vote for each opportunity or may cast all votes for a single opportunity or any multiple thereof. The number of votes each person may cast may be determined by the number of proposals, or according to a weighting system as described below. For example, the managing partner may be given twice as many votes as there are proposals. In a further embodiment, each member may be required to rank investment opportunities in order of preference. In yet another embodiment, each member may score a proposal with a number in a particular range, for example 1-10, though any range may be used. The scores are then totaled and the proposal with the highest score(s) is funded.

Each member of the venture capital firm may be entitled to an equal number of votes, or the number or value of votes may be weighted depending on a variety of factors, including but not limited to, seniority, skills, position in the venture capital fund, personal investment in the venture capital fund, length of time a character has been in existence, type of account held by player, the amount of funding they were able to secure for the venture capital fund, or any other criteria as described in the organizational documents, determined by the game, or other overseeing authority. For example, in one embodiment, the votes of members of the management team may be more heavily weighted than votes of other members of the venture capital fund. In another embodiment, some or all members of a venture capital firm may be able to veto an investment decision. For example, the managing director may be required to give approval for all investment decisions. In a further embodiment, the managing members of an entity acting as a venture capital fund may have more heavily weighted votes or may have veto power. For example, if a bank or other financial entity is acting as a venture capital fund, the votes of the owners of the bank may count more heavily than the votes of those that work at the bank. If a city is acting as a venture capital fund, the vote of the elected officials or other ruling entity may be more heavily weighted than the vote of a non-ruling resident.

In order to be funded, a proposal for investment may be required to obtain a simple majority, the highest score, a supermajority, a unanimous decision, or slightly less than a unanimous decision such as unanimity minus one, unanimity minus two, etc.

In another embodiment, investment decisions may be made by consensus. In a further embodiment, each member of the venture capital fund or each member of the management team may have the ability to approve an investment up to a particular monetary amount without submitting it to the rest of the fund for a vote. The terms for determining approval of an investment decision may be outlined, for example, in the organizational documents.

If a virtual venture capital firm decides to make a virtual investment, it may or may not prepare a term sheet or letter of intent. In one embodiment, a game environment may be required to present a term sheet or letter of intent to the virtual venture capital fund. Such term sheets may provide information related to funding including, but not limited to, valuation, the amount and staging of the investment, the type of securities issued, protection from dilution, and the ability/right to seek alternative funding; corporate governance including, but not limited to, decision making powers, the composition of the board of directors or other governing entity, voting rights, revisions to the by-laws or other governing documents and information rights; and liquidation, including, but not limited to how the venture capital fund will get their money out of the business, the exit strategy, redemption rights, registration rights, and participation rights. Term sheets may be generated by any means applicable. In one embodiment, such term sheets are generated by manage VC investment program 314. Final versions may be stored in VC agreements database 338 which may additionally include information such as agreement ID; agreement Parties 1-n; party type; and agreement terms and conditions. Each investment made by a virtual venture capital fund may be registered using register VC investment program 312. In another embodiment, term sheets are binding in that every activity of the funded entity must comply with the requirements listed in the term sheet or it will be blocked.

In another embodiment, an entity may engage in white collar crime in order to circumvent various requirements. Entities that engage in white collar crime may gain experience points or skills in committing these types of crimes. For example, it may be possible to circumvent the term sheet. The circumvention may take place using particular skills or attributes, for example, a high level of the "feather bedding" skill or similar skill such as "pay bribe" or "cook the books"

could allow a funded entity to make cushion payments outside of the contract rules, or to pay bribes. According to this embodiment, entities who achieve a certain amount of points or skill levels in a given white collar crime may be allowed to ignore, bypass, break, or otherwise not obey some or all of the rules in the game. The rules that these entities may break may be dependant upon the types of white collar crime in which the entity has previously engaged.

Once an investment decision is made, investments may need to be registered. Such registration may take place using any means applicable. In one embodiment, registration of an investment may use any register VC investment program 312. Register VC investment program 312 may use some or all of the following steps. 1. Receive a term sheet from a VC to fund an investment. 2. Determine if the investment qualifies based on VC licenses and investment type. 3. Approve investment and register investment.

In another embodiment, the term sheet may require review before registration may be approved. Initiate VC Investment program 330 may be configured to use some or all of the following steps: 1. Receive a request to fund a virtual project from one or more player characters 2. Determine an ownership investment structure for the project 3. Output investment structure to player characters 4. Receive acceptance of structure 5. Transmit virtual project and ownership investment structure to Game Server 6. If structure is accepted, a. receive registration number b. notify player character's the project was accepted c. transmit virtual money for project to project account d. transmit virtual cash fee to game server to register complete project registration 7. if structure is not accepted a. receive notice of why structure was not accepted, including changes required to make it acceptable from the game server b. revise structure according to change requests c. transmit revised structure to player characters d. Receive acceptance of revised structure e. Transmit revised structure to game server for approval 8. receive registration number. 9. notify player character's the project was accepted. 10. transmit virtual money for project to project account. 11. transmit virtual cash fee to game server to register complete project registration.

The term sheet may also include the type of security that is being provided to the venture capital fund in exchange for the investment. Such security may be debt or equity. In one embodiment, such a security may be convertible preferred stock. There may also be dividends to be paid. Such dividends may begin accruing immediately once funding starts. They may accrue on the entire investment, or just the stage of investment reached at that point. Dividends may also be converted into stock if the company is sold or has a public offering.

An agreement with a virtual venture capital fund may also include an anti-dilution provision. In one embodiment, the percentage ownership will always remain the same as when the initial investment was made. In another embodiment, there may be a conversion formula adjustment attached to convertible preferred stock, convertible debt or debt with warrants obtained by the virtual venture capital fund. The formula adjustment may be "full ratchet" in which if the company issues even one share of stock at a price below the price paid by the investors, then the conversion price drops fully to that price. In another embodiment, the formula adjustment may be a "weighted average ratchet" in which the conversion price is adjusted to the average price received by the company for stock issuances. This average may or may not take into account the amount of money raised at different prices.

A virtual venture capital fund may also seek control over game environment governance issues. For example, they may seek control over such things including, but not limited to, the calling of elections, the selection and removal of the CEO, or other titular head of the game environment, compensation of the managers of the game environment, board membership, or other executive membership, political appointments, voting rights, raising the debt ceiling, selling assets above a given threshold, issuing additional stock, changing the rights and structure of the classes of stock, stock options, acquisitions, sales and mergers.

In another embodiment, the venture capital fund may seek such things as redemption rights, registration rights, drag-along rights, tag-along rights, and participation rights. In one embodiment, the venture capital fund may acquire the right to sell the game environment or take it public. In another embodiment, the venture capital fund may require the game environment to purchase the virtual venture company's stock after a certain period of time, or upon the occurrence or nonoccurrence of certain milestones.

Once terms are agreed to, investment by a venture capital fund may take place in a single lump sum or in stages. In one embodiment, each stage of investment may be contingent on the meeting of certain conditions or milestones. In another environment, a venture capital fund may require that additional funds or other income sources be brought in at certain stages.

According to one embodiment, an account may be created with a financial entity, or with the VC fund that contains the funding. Virtual invoices may be submitted, reviewed and verified before payments are released. Such funds may be used to make qualified purchases as outlined above, or to hire virtual architects, craftsmen, designers, or characters with other skill sets important in the development of the project for which funding was sought. For example funds could be released using some or all of the following steps: 1. Receive a request to pay a virtual invoice. 2. Determine if the invoice is from a qualified virtual entity. 3. Determine if virtual build contract has budget allocated for the invoiced product or service. 4. Release funds to pay the invoice if the invoice is qualified for payment. In another embodiment, determinations could be made regarding how the virtual invoice fills the allocations in the budget for particular tasks or types of assets. For example, payment of the virtual invoice could be made using some or all of the following steps: 1. Receive a request to pay a virtual invoice. 2. Determine virtual cash budgeted for invoiced item or service. 3. If virtual cash budgeted is less than invoice by x %, flag account. 4. Transmit warning to VC fund and/or funded entity administrator that invoice is out of budget.

According to another embodiment, the funding from the VC may be issued as a virtual debit card. The use of the card may be limited to purchases that are specified in the term sheet or other agreements between the VC fund and the borrowing entity. Player characters and game environments can give these debit cards to other player characters or game environments who can use the outstanding or remaining balance on them for virtual purchases specified when the debit card was created. Debit cards can be given to a first player character when a second player character relies on the first player character to purchase something for him, but cannot trust the player character with virtual cash that has unrestricted purchase parameters. Debit cards can be used to create in game payment vehicles that can only be used to purchase certain virtual assets and/or services. Debit cards can also be created that have access to specified amounts of funds. Such amounts may be a percentage of the cash available in the funding round or may be a fixed amount or a combination thereof such that there is a minimum or maximum percentage of available assets that can be used or minimum fixed amount and a percentage that is available.

Information regarding the virtual debit card may be stored by any means applicable. In one example, such information is stored on game server 302. In another embodiment such information is stored on bank server 304.

A Debit Card Database 326 or 335 may comprise information such as: 1. VC ID 2. Debit Card ID 3. Debit Card Amount by category 1-n 4. Debit Card Issue Date 5. Debit Card Conditions 1-n In another embodiment, information regarding the virtual debit card may be stored on game server 302 through Debit Card Issuance program 319 which may be configured to: 1. Receive an indication that a debit card was issued from a VC fund including player character info, VC info, debit card amount and conditions 2. Create and store debit card record According to another embodiment, percentages of the virtual debit card value can be allocated to different virtual asset classes. For instance, 50% of the value could be used to buy specific raw materials and 40% could be used to purchase services from specific NPCs and player characters to turn those raw materials into a specific product. The remaining 10% of the value could be used for anything, but, for example, only when the other 90% has been spent to create the specific product and that product has been deposited into the virtual debit card issuer's account. The specific virtual asset classes or services may be outlined in the term sheets or determined by a) the VC fund, b) the game manufacturer, c) the owner(s) of the server(s) upon which the game resides, d) one or more player characters or e) any combination thereof.

Information regarding the issuance of the virtual debit card may be stored according to any means applicable. In one embodiment, Debit Card Issuance program 319 may be configured to follow one or all of the following steps: 1. Receive a request to create a debit card including a virtual cash amount, a specified receiver of the card, and conditions (if any) for spending the virtual cash from one or more player characters. 2. Create debit card including usage conditions (if any). 3. Transfer cash from player character(s) account(s) to debit card. 4. Output debit card to specified receiver. 5. Notify player character(s) and game server that debit card was created and issued. 6. Update debit card database.

Information regarding the allocations and usage of the virtual debit card may stored according to any means applicable. In one embodiment, such information may be stored on Debit Card Usage program 320 on the bank server which may be configured to follow some or all of the following steps: 1. Receive an indication that the purchase of a virtual item or service will be paid for with a virtual debit card. 2. Determine if purchase qualifies based on debit card conditions (if any). 3. If purchase is qualified, allow purchase and deduct virtual cash from the account balance. 4. If purchase is not qualified, disallow purchase. 5. Notify bank that purchase was attempted and made.

In another embodiment, Debit Card usage information may be stored on the game server and Debit Card Usage Program 320 may be configured to: 1. Receive request to use debit card from a player character to purchase an in game good or service or to pay a debt. 2. Determine if use falls within debit card condition parameters (if any) 3. Allow use if condition parameters allow it 4. Don't allow use if it falls outside of condition parameters 5. Notify player character using debit card, player character(s) who created debit card, and game server if debit card was used or not allowed to be used. 6. Update remaining cash balance Such limitations could also be imposed using, for example, Fund Usage Program 339.

Funding may additionally be issued in the form of a virtual credit card in which the character, group of characters or virtual environment may make purchases up to the amount of the funding provided by the VC fund using the virtual credit card or may give the virtual credit card to another party to make the purchases. Such credit cards may be issued, for example, using Credit Card Issuance Program 328. The VC fund may limit the use of the credit card to purchases in support of the term sheet, or reason for obtaining the funding, or may allow any purchases to be made. The credit on the credit card may additionally be allocated to different virtual asset classes as described above for virtual debit cards. Such information may be stored by any means applicable, for example in Credit Card Database 324 or 337. In one embodiment, the credit line on the credit card may be increased at additional stages of funding.

Figure 7:
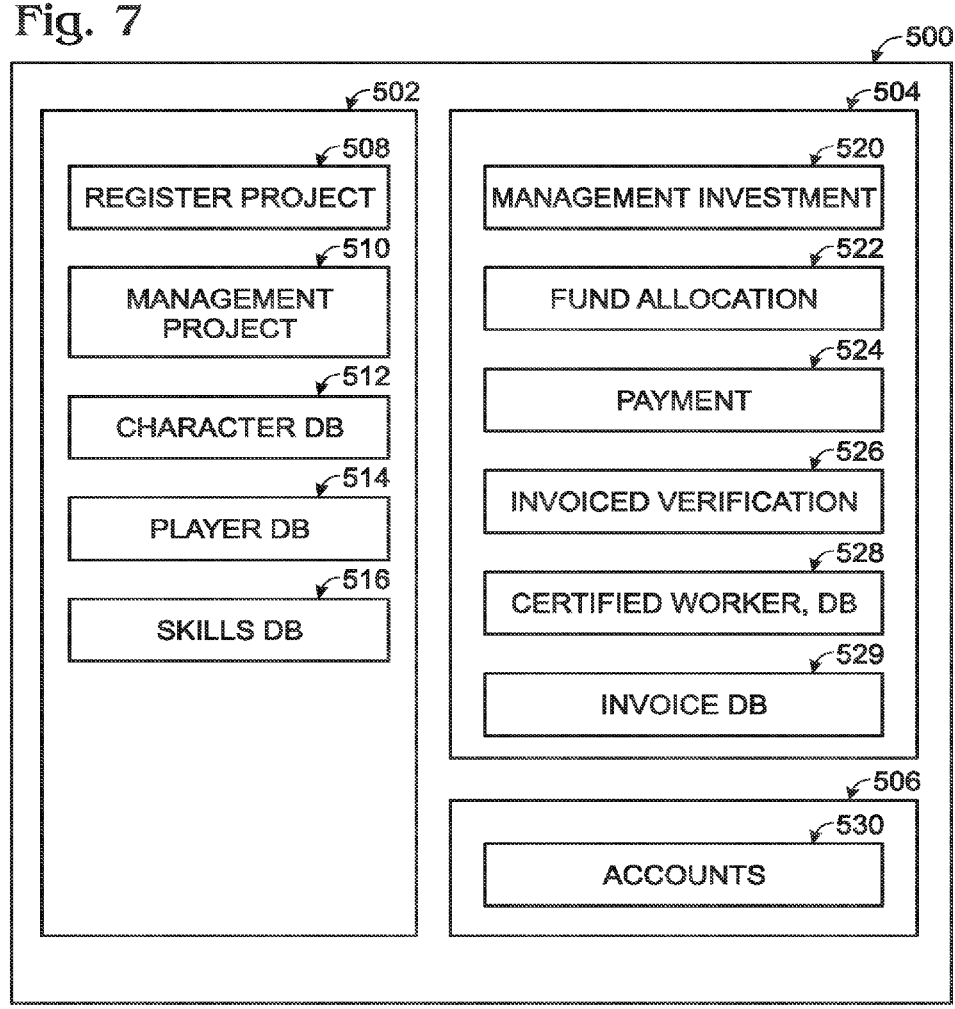
FIG. 7 depicts a system 500 according to an embodiment.

In another embodiment, funding may only be used with certified vendors. Such a system 500 is exemplified in FIG. 7. System 500 may include a game server 502, a VC fund server 504, and a bank server 506.

Game server 502 may include a register project program 508, and a manage project program 510. Game server 502 may additionally have one or more databases, such as, but not limited to, a character database 512, player database 514, and a skills database 516. Venture capital server 504 may include a manage investment program 520, Fund allocation program 522, payment program 524, invoice verification program 526, certified worker database 528, and invoice database 529. Bank server 506 may include an account database 530.

Each funded project may be registered using register project program 508 which could include information such as the fund source for the project, timelines, blueprints, ownership, resource allocation, or any other details descriptive of the project. The project could be managed using manage project program 510. Such management may include oversight of budgeting, funding, construction, workers, resource allocation and deadlines. Information regarding characters involved in the project such as their identification, assets, responsibilities, and skills may be stored in character database 512. Player database 514 may contain information regarding the players behind the characters and include the players, identification of the players, billing information, and character information. The types of skills available in a particular game environment or a particular area of a game environment and the number, or names of characters with those skills could be stored in skills database 516.

Virtual venture capital funds may be managed using manage investment program 520. Such a program could manage selection of investments, control of investments, track payments, funding, dividends, budgets, invoices, timelines, deadlines, milestones or any other information necessary to adequately manage the portfolio and projects funded by the venture capital fund. Each investment funded could have funding allocated to specific pieces, for example 30% to natural resources; 15% to design; 40% to labor costs; 10% to management; 5% to taxes, fees and licenses. Such allocations may be controlled and/or determined using Fund allocation program 522. Payments in each of the allocated categories could be made using payment program 524. In one embodiment, payment program 524 will only release funds once the object the funding is paying for is completed. In another embodiment, payment may be released in stages, for example 10% upon initiation of the project, 25% when the project reaches a certain point and the remainder released upon completion. Vendors and service providers may be required to submit invoices which could be verified using invoice verification program 520 and a history of payments, or submitted invoices may be stored using invoice database 529. Certain skill sets may be required in order to work on the project, or only certified workers may be allowed to work on a project. Information regarding the necessary skills and/or a list of certified workers and their available skills may be stored in certified worker database 528. Payment of the workers and of the supplies could be made into different accounts owned by characters, suppliers, game environments, or accounts established for the project or the VC fund. Such information may be stored in account DB 530.

If a project runs over budget or behind schedule, warnings may be issued to the game environment or the VC fund. Such warnings may result in fees being charged to the virtual contractors, or the game environment or other entity that received the funding from the VC fund. In one embodiment, fees could be charged to the accounts of the characters responsible. In another embodiment, the fees could be charged to the funding account resulting in fewer funds available for completing the project. The VC fund may also halt or withdraw funding. For example, such warnings could be issued using one or more of the following steps: 1. receive warning that project is over budget or behind schedule. 2. output warning to VC fund 3. determine or receive fee. 4. charge fee to project account, or project manager character accounts. In a yet another embodiment, the terms of the funding could be renegotiated or another round of funding may be initiated. Such negotiations could take place using some or all of the following steps: 1. Receive an indication that a project is over budget. 2. Output a request to renegotiate the project. 3. Receive a renegotiation term sheet. 4. Determine if term sheet is acceptable. 5. If acceptable, accept term sheet and modify original term sheet. 6. If unacceptable, determine counter offer. 7. Output counter offer terms. 8. Receive acceptance of counter offer terms. 9. Modify original term sheet.

At some point, the virtual VC fund will seek a return on its investment. Such a return may take the form of dividends, divestment of the investments, sale of assets, the sale of stock, or in an initial public offering.

The use of dividends may be controlled, for example, by receive dividend program 332. Receive dividend program 332 may also track the payment of dividends, for example, using some or all of the following steps: 1. Determine that a dividend is due. 2. Determine a dividend amount based on virtual project performance and investment structure conditions. 3. Output request for dividend payment. 4. Receive payment. Or 5. If payment is not received, retrieve credit card(s) associated with project. 6. Determine a real cash value of the virtual cash dividend. 7. Charge real cash value to credit card(s).

According to an alternate embodiment, Receive Divided program 332 may be configured to: 1. Receive a virtual dividend for a virtual investment from the game server. 2. Deposit virtual cash into virtual account. 3. Flag investment as "dividend paid".

In another embodiment, dividends could be managed by manage VC program 310. In one embodiment, manage VC program 310 could determine when any fund are due to the VC fund. Such funding may come from promises from investors, dividend payments, conversion of assets, sale of stock, or any other applicable source. In one embodiment, manage VC program 310 may be configured to perform some or all of the following steps: 1. Receive an indication that a VC investment has a dividend payment due. 2. Output dividend request to investment. 3. Receive dividend payment. 4. Transmit payment to VC fund account. 5. Generate and charge the VC fund a dividend payment processing fee. If the payment, regardless of source, is not received in a timely manner, or after a specific length of time, whether that time is days, weeks, months, or some other time interval agreed upon in the documents governing the payment, manage VC investment program 314 could be configured to perform some or all of the following steps: 1. Notify VC fund and investment that dividend was not received. 2. Determine a penalty. 3. Apply penalty. 4. Charge VC fund fee for applying penalty.

Such a penalty may be monetary or non-monetary and may be governed by the term sheet or other documents dictating the terms of payment.

In another embodiment, the game environment, character (s) or player(s) seeking the venture capital funding must provide certain guarantees. Such guarantees may be used to ensure that dividends or other obligations are paid to the venture capital company and to ensure against loss of the initial investment. Guarantees may take the form of financial or non-financial collateral as defined above, for example a credit line or an escrow account containing assets which may be liquidated in the event of a default. Such guarantees may be locked as explained above using lock credit line program 340 or pinged to determine viability using ping credit line program 342. Account information for collateral may be stored by any means applicable, for example in account database 344.

In one embodiment, if the dividend, milestones or other obligations are not met, the VC fund may initiate a sale of assets program, for example, sale of assets program 336. Such a program may be configured to perform some or all of the following steps: 1. Receive an indication that a payment has been missed. 2. Initiate the sale of a virtual asset provided as a guarantee. 3. Determine virtual proceed amount based on ownership percentage defined by investment agreement. 4. Transmit request for virtual proceed amount to player character(s) who own the asset including a virtual cash amount and a date due. 5. Receive a virtual cash payment equal to the virtual proceed amount. In the event that the owner is unable to provide the cash payment, some or all of the following steps may be used: 1. Determine that cash payment is not made by date specified. 2. Retrieve the credit card(s) associated with the investment. 3. Determine a real cash value equal to the real cash value of the virtual proceed amount. 4. Charge the real cash value to the credit card(s).

In another embodiment, a virtual VC fund may seek to divest itself of some or all of its investments or other holdings. Such sales could be performed using Receive Proceeds from Sale of Assets program 334 using some or all of the following steps: 1. Receive or request the sale of a virtual asset. 2. Receive a selling price. 3. Receive a virtual cash value based on the ownership percentage defined by the investment agreement. 4. Mark investment record as sold.

Another source of funding is through a public offering. Once a game environment goes public, the sale of shares may be accomplished by any means applicable. In one embodiment, shares are sold using a system such as the exemplary system 400 shown in FIG. 4. As shown, system 400 includes a master game server 402 a game environment server 406 and an exchange server 404. Public offerings in game environments are described, for example, in U.S. patent application Ser. No. 11/428,263, filed Jun. 30, 2006 and Ser. No. 11/567, 122, filed Dec. 5, 2006, each of which is hereby incorporated by reference. Furthermore, inter- and intra-game exchanges are also described in U.S. patent application Ser. No. 11/428, 263, as well as in U.S. patent application Ser. No. 11/560,456, filed Nov. 16, 2006, which is also hereby incorporated by reference.

Game environment server 406 may include databases such as player database 414, player character database 416, exchange open offers database 428, exchange transaction database 420.

In one embodiment, Player Database 414 may include information such as, but not limited to Player ID, Player Billing Info, Player Personal Info, Player Credit Info, Player Exchange Seat ID, and Player Assets. Player Character Database 416 may include information such as, but not limited to, Character ID, Player ID, Character Assets, Character inventory, Character Skills, Exchange Seat Owner Account Number, Exchange Seat Number, virtual account numbers.

Exchange Server 404 may include or host various programs, routines, subroutines and/or databases including, but not limited to an exchange database 408, an exchange open offers database 410, and an exchange transaction database 412.

In one embodiment, Exchange database 408 may include information such as, but not limited to, exchange ID, exchange type, allowable assets, and allowed traders. In another embodiment, exchange database 408 may include information regarding seats on the exchange such as the exchange seat price, maximum exchange seats allowed, exchange seats issued, and exchange seat qualifying conditions. Exchange open offers database 410 could contain information such as: 1. Offer ID 2. Offer type 3. Offer posting date 4. Offer expiration date 5. Offer Item 6. Offer Quantity 7. Offer Price.

Exchange open offers may additionally be associated with the character or player submitting the offer. Such information could be stored in Exchange Open Offer Database 428 and include information such as the character ID, holdings, offer ID, offer type, offer posting date, offer expiration date, offer item, offer quantity, and offer price.

In one embodiment, each transaction could be stored in an Exchange Transaction Database, for example in Exchange Transaction Database 412. Such a database could store information such as: 1. Order ID 2. Order Buyer 3. Order Seller 4. Order Date 5. Order Price 6. Order Type 7. Order terms and conditions In another embodiment, such transactions could be associated with the character in Exchange Transaction Database 420. Such a database could include information such as character ID, character inventory, order ID, order date, order, price, order type, and/or authentication number.

Shares on virtual exchanges may be purchased using real currency, virtual currency, virtual assets, real assets, or any combination thereof. In one embodiment, purchases may be made in any currency or asset. In another embodiment, the value of the currency or asset must be converted to a specified currency by an exchange rate or conversion rate.

The exchange rate for one type of virtual currency for another type of virtual currency, virtual currency for real currency, virtual assets for real assets, real assets for virtual assets, real assets for virtual currency, virtual assets for real currency or virtual assets for virtual currency may be fixed in that the rate does not change for the duration of the game or segment of the game. Alternatively, the exchange or conversion rate may be variable. Such a variable rate may be pegged to a floating real world exchange relationship, for example the U.S. dollar/Japanese yen spot exchange rate, a percentage thereof, a plus or minus adjustment thereof, some other economic indicator, or a combination thereof. The exchange rate may also vary depending on the country of origin of the player, or may be fixed to a particular real world currency, i.e., all exchange rates are quoted in dollars. In another embodiment, the exchange rate may be floating and determined by market forces such as the relative demand for virtual currency versus real world currency, or the relative demand of particular types of virtual currency. Said exchange rates may further be established or determined by any suitable method including, but not limited to, by a) the game manufacturer, b) the owner(s) of the server(s) upon which the game resides, c) one or more player characters, d) market forces, e) law or regulation of the game or within the real world, f) negotiation among the affected parties, or g) any combination of the above:

In the event that the game environment becomes delinquent in payments, whether loan payments, dividend payments, bond payments, or the meeting of certain milestones, the game environment and/or the characters and/or players securing the loan or bonds for the game environment or guaranteeing returns for the VC fund may have one or more limitations imposed upon his actions in the virtual world by a) the bank, b) the game manufacturer, c) the owner(s) of the server(s) upon which the game resides, d) one or more player characters, e) the VC fund or f) any combination thereof. According to one embodiment, the delinquent game environment may be prevented from obtaining any further funding. In another embodiment, the players guaranteeing the funding may be blocked from converting virtual currency to real currency. In a further embodiment, a lien may be imposed upon the assets of the game environment. In yet another embodiment, the game environment or the players and/or characters guaranteeing the funding may be excluded from transacting business, owning land, or engaging in other contracts within the virtual world. Additionally, or alternatively, the assets of the game environment or securing players and/or characters may be seized and sold to cover the debt, for example by using a program such as initiate sale of assets program 328. The proceeds from such a sale would then be deposited with the account of the injured party, for example using receive proceeds from sale of assets program 326. The real world credit line used to secure the debt may also be charged in real world currency to cover the amount due. In one embodiment, upon delinquency, the entire amount of the loan may become immediately due. In a further embodiment, the funds may be automatically debited from the account guaranteeing the funding. In another embodiment the virtual representation of the game environment can be altered to indicate that the game environment has a delinquent account. In a further embodiment, if a payment is missed, any preferential terms may be subject to change. For example, the interest rate could increase, payment terms could accelerate, guaranteed exchange rates could become variable, caps on interest or exchange rates could be removed, etc.

Types of transactions may be limited by the level of participation of the player or player character. Such limitations could depend upon the skill, experience, and sophistication of the authorized user and/or the player's real or virtual credit score and/or real or virtual current or predicted income levels. For example, players may advance through different levels of play and after achieving certain benchmark standards or having an account established for a particular length of time, they may be granted wider access to financial intermediaries and the services provided by such intermediaries.

It will be appreciated that while, for the sake of discussion, various databases have been described separately, the data in these and any other suitable databases could be merged into a single large databases and/or maintained separately in additional databases, or in other structures besides a database. Moreover, any such databases could be independent or linked, and the data in these databases could be stored centrally on a server or separately on game devices.

The present disclosure provides numerous systems and methods related to virtual environments in online computer games. It should be appreciated that numerous embodiments are described in detail and that various combinations and subcombinations of these embodiments are contemplated by the present disclosure.

What is claimed is:

1. An apparatus comprising:
a processor; and
a tangible computer readable medium in communication with the processor;
in which the computer readable medium stores rules providing one or more Venture Capital (VC) fund requirements that must be fulfilled by an entity desiring to register create a venture capital fund;
in which the computer readable medium stores instructions which, when executed by the processor, direct the processor to
run a massive multi player online game that is operable to simultaneously support a plurality of players via a plurality of video game devices,
in which each of the players controls at least one player character,
in which play of the game continues regardless of whether players are logged in to the game;
receive, from at least one of the player characters, a request to register a venture capital fund;
determine that the player character requesting to register a venture capital fund fulfills the VC fund requirements defined by the stored rules;
receive an application for a project to be funded by the VC fund;
determine if the project that is to be funded by the VC fund qualifies for funding from the VC fund; and
register the project and an ownership percentage of the VC fund in the project.

2. The apparatus of claim 1 in which the computer readable medium further stores instructions which, when executed by the processor, direct the processor to
receive VC funding fund fees from the player character; and
receive from the player character a guarantee of the funding using a credit card account.

3. The apparatus of claim 1 wherein the rules stored by the computer readable medium provide a requirement that the player character own a given quantity of one or more virtual assets;
and wherein the computer readable medium further stores instructions which, when executed by the processor, direct the processor to determine that the player character owns a given quantity of one or more virtual assets.

4. A method performed by a computer, the method comprising:
running, by a Video Game Central Server, a massive multi player online game that is operable to simultaneously support a plurality of players via a plurality of video game devices,
in which each of the players controls at least one player character,
in which play of the game continues regardless of whether players are logged in to the game;
receiving, by the Video Game Central Server, from at least one of the player characters, a request to register a venture capital (VC) fund;
determining, by the Video Game Central Server, that the player character requesting to register a venture capital fund fulfills one or more VC fund requirements defined by stored rules;
receiving, by the Video Game Central Server, an application for a project to be funded by the VC fund;
determining, by the Video Game Central Server, if the project that is to be funded by the VC fund qualifies for funding from the VC fund; and
registering, by the Video Game Central Server, the project and an ownership percentage of the VC fund in the project.

5. The method of claim 4 further comprising
receiving, by the Video Game Central Server, VC funding from the player character; and
receiving, by the Video Game Central Server, from the player character a guarantee of the funding using a credit card account.

6. The method of claim 4 wherein the rules further provide a requirement that the player character own a given quantity of one or more virtual assets; and the method further comprises:
determining that the player character owns a given quantity of one or more virtual assets.

* * * * *